US008275583B2

(12) United States Patent
Devarajan et al.

(10) Patent No.: US 8,275,583 B2
(45) Date of Patent: Sep. 25, 2012

(54) SYSTEM AND METHOD OF INTERACTIVELY OPTIMIZING SHIPPING DENSITY FOR A CONTAINER

(75) Inventors: Velmurugan Devarajan, Livonia, MI (US); Sergio Angotti, Canton, MI (US); Jennifer Taverna, Northville, MI (US); Dimitar Petrov Filev, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 506 days.

(21) Appl. No.: 12/506,553

(22) Filed: Jul. 21, 2009

(65) Prior Publication Data

US 2009/0299790 A1 Dec. 3, 2009

Related U.S. Application Data

(63) Continuation-in-part of application No. 11/229,082, filed on Sep. 16, 2005, now abandoned.

(51) Int. Cl.
*G06F 17/50* (2006.01)
(52) U.S. Cl. .................................. 703/1; 703/6
(58) Field of Classification Search .................. 703/1, 2, 703/6, 7
See application file for complete search history.

(56) References Cited

U.S. PATENT DOCUMENTS

| 6,721,762 B1 | 4/2004 | Levine et al. |
| 6,876,958 B1 | 4/2005 | Chowdhury et al. |
| 6,877,297 B2 | 4/2005 | Armington et al. |
| 7,085,687 B2 | 8/2006 | Eckenwiler et al. |
| 7,366,643 B2 * | 4/2008 | Verdura et al. ................... 703/1 |
| 2003/0163292 A1 | 8/2003 | Eckenwiler et al. |
| 2003/0200111 A1 | 10/2003 | Damji |
| 2004/0044537 A1 | 3/2004 | Aberle et al. |
| 2005/0055181 A1 | 3/2005 | Verdura et al. |

OTHER PUBLICATIONS

Gogg et al., "Introduction to Simulation", Proceeding of the 25th Conference on Winter Simulation, 1993, pp. 9-17.*
Cagan et al., "A survey of computational approaches to three-dimensional layout problems", Computer-Aided Design, vol. 34, Issue 8, Jul. 2002, pp. 597-611.*
C.S. Chen, et al., An Analytical Model for the Container Loading Problem, European Journal of Operational Research vol. 80, Issue 1, (1995), pp. 68-76.

* cited by examiner

*Primary Examiner* — Saif Alhija
*Assistant Examiner* — Herng-Der Day
(74) *Attorney, Agent, or Firm* — Raymond L. Coppiellie; Brooks Kushman P.C.

(57) ABSTRACT

A system and method for interactively optimizing shipping density of racked parts by a user is provided. The system includes a user computer system, a communications network, a remotely located computer system, a data storage device a computer-generated model of a component part; a computer-generated model of a container for transporting the component part and an executable shipping density optimization software program. The methodology includes the steps of the user selecting the component part model and container. The methodology also includes the steps of analyzing the shipping density of component parts within the container. The methodology further includes the steps of identifying a bottleneck feature and modifying the bottleneck feature and determining the optimized density of the modified component parts in the container.

16 Claims, 28 Drawing Sheets

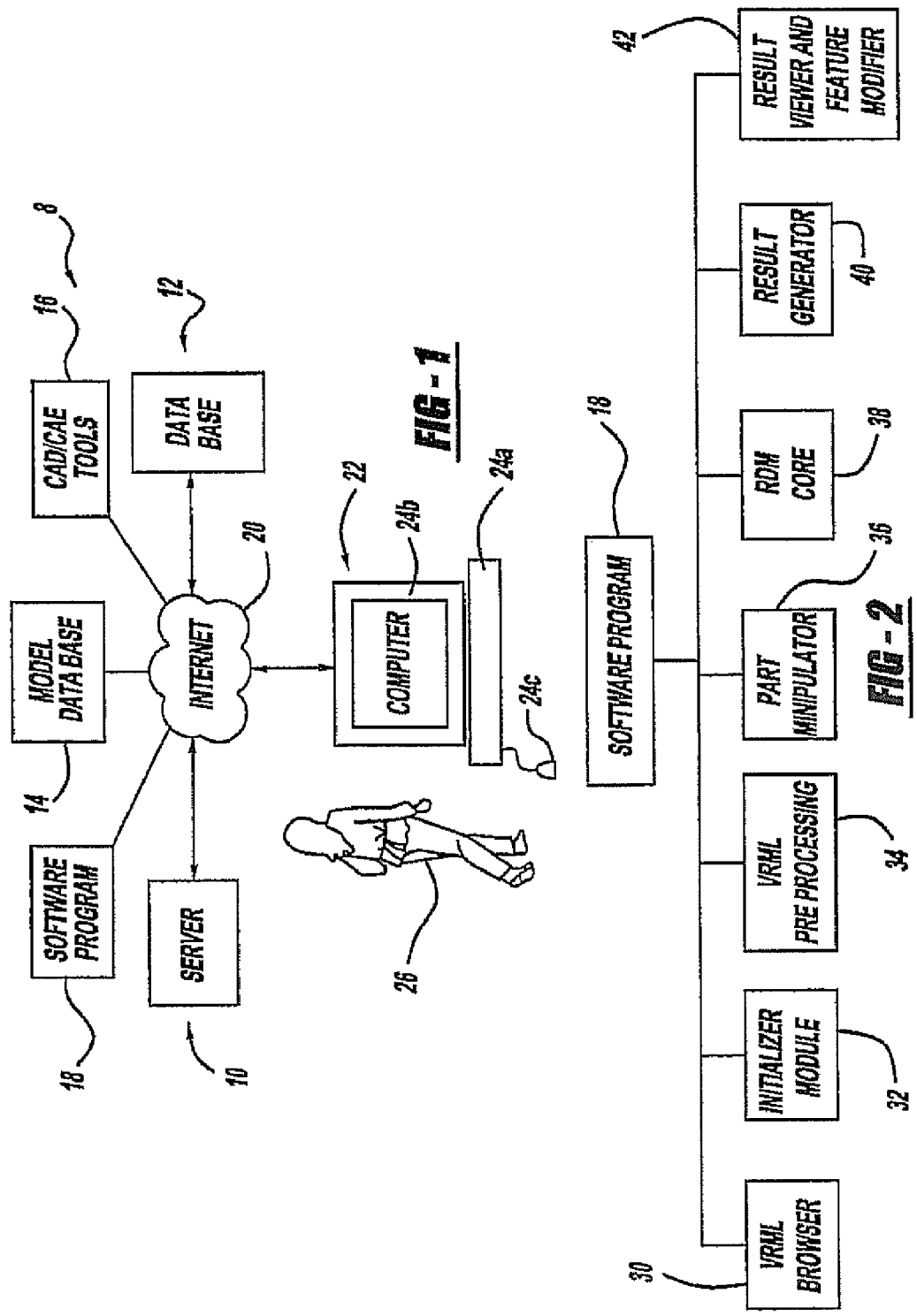

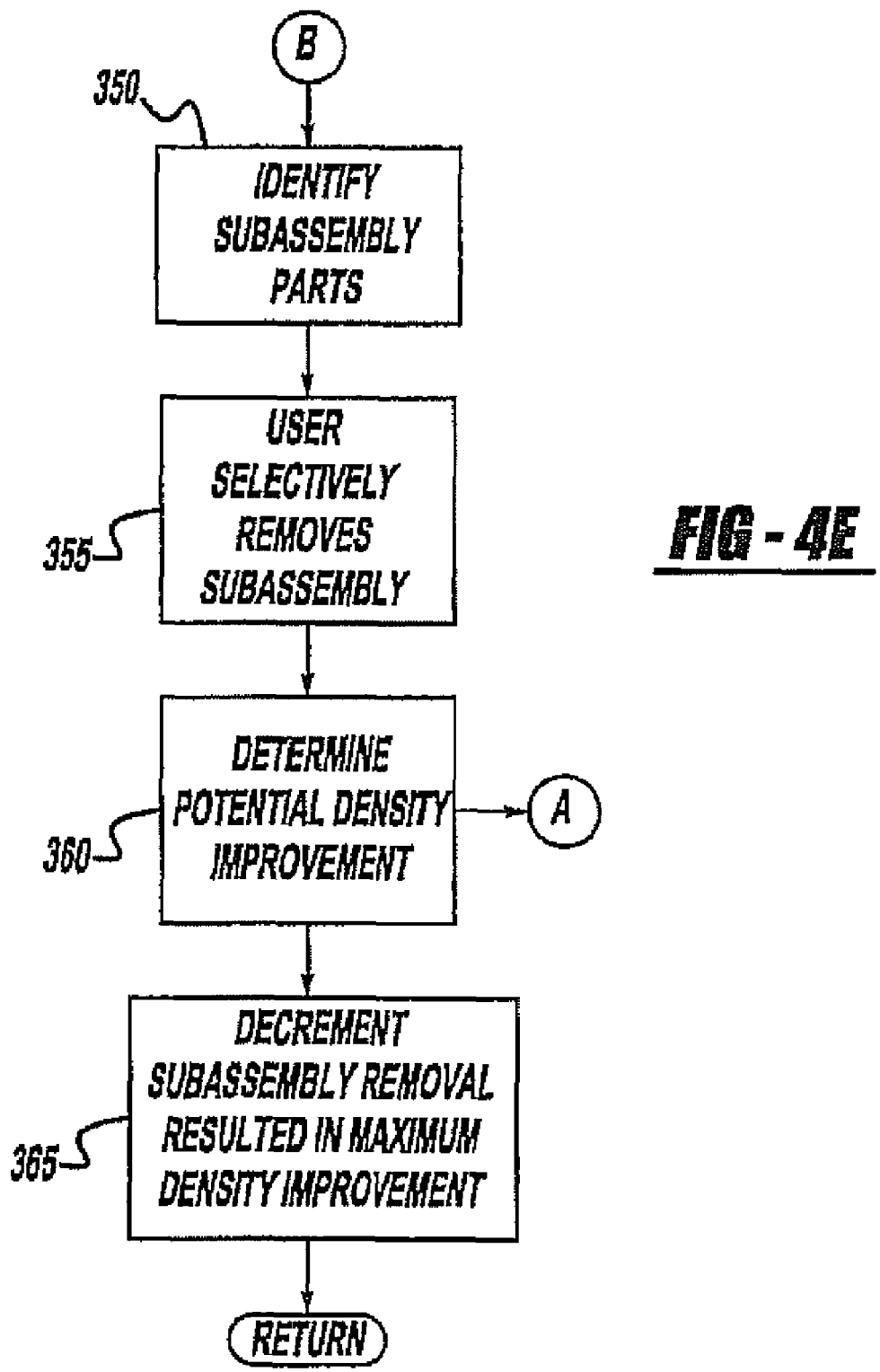

PART INSTANCE LOADING OPTIONS — 68

| COUNT | LOAD | PART NAME | BOUNDING BOX (INCHES) | |
|---|---|---|---|---|
| 1 | ☑ | PUSH PIN:GO4L34-16E132-A_PIA2;3,01.07.00... | 83.208 36.229 49.722 | 83.356 36.992 50.422 |
| 2 | ☑ | PUSH PIN:GO4L34-16E132-A_PIA2;3,01.07.00... | 82.175 36.344 37.272 | 82.323 37.038 37.971 |
| 3 | ☑ | PUSH PIN:GO4L34-16E132-A_PIA2;3,01.07.00... | 84.628 36.19 28.869 | 84.8 36.883 29.563 |
| 4 | ☑ | SEAL:GO4L34-16E132-A_PIA2;3,01.07.00... | 83.244 36.659 51.969 | 83.362 36.659 53.224 |
| 5 | ☑ | REINF-FRT FENDER FRT RH:GO4L34-16144-A;A... | 45.024 31.826 38.846 -1 | 45.024 35.004 40.315 -1 |

SAVE OPTIONS AND CLOSE

RACK THICKNESS & CLEARANCES

CONTAINER DIMENSIONS (INCHES)

| | LENGTH | WIDTH | HEIGHT |
|---|---|---|---|
| RACK THICKNESS | 2.5 | 2.5 | 2.5 |
| DIVIDER THICKNESS | 1.0 | 1.0 | 1.0 |

MINIMUM CLEARANCE BETWEEN PARTS IN MM: 12.0

OK    CANCEL

FIG - 10

DENSITY ANALYSIS

BASE DENSITY | CONSTRAINT TRIMMED DENSITY | MULTI LEVEL CONSTRAINT TRIM

PART FIT
- FIRST PART FIT IN RACK: YES, PART SMALLER BY (71.358, 14.739, 9.347) INCHES
- SECOND PART FIT IN RACK: YES, PART SMALLER BY (—, 14.739, 9.347) INCHES

BASE DENSITY
- PARTS IN RACK: 11
- PARTS IN CONVEYANCE: 110
- RACK SPLITS: 111

DENSITY GUIDANCE
RACK SIZE INCREASE TO ADD MORE PARTS RACK SIZE & MULTI RACK ID

| 1.390 21.561 39.165 | 96 62 69 |

DENSITY CONSTRAINTS (PART IDs): 8, 5 AND 8, 5

PART FIT
- PART FIT TEST

BASE DENSITY
- QUICK DENSITY
- OPTIMIZED DENSITY

TRIM
- TRIM CONSTRAINT
- UNDER TRIM
- FIND CONSTRAINT & TRIM
- MULTI LEVEL TRIM

STATUS
DONE: DENSITY ESTIMATE AT CURRENT STATE

FIG - 11

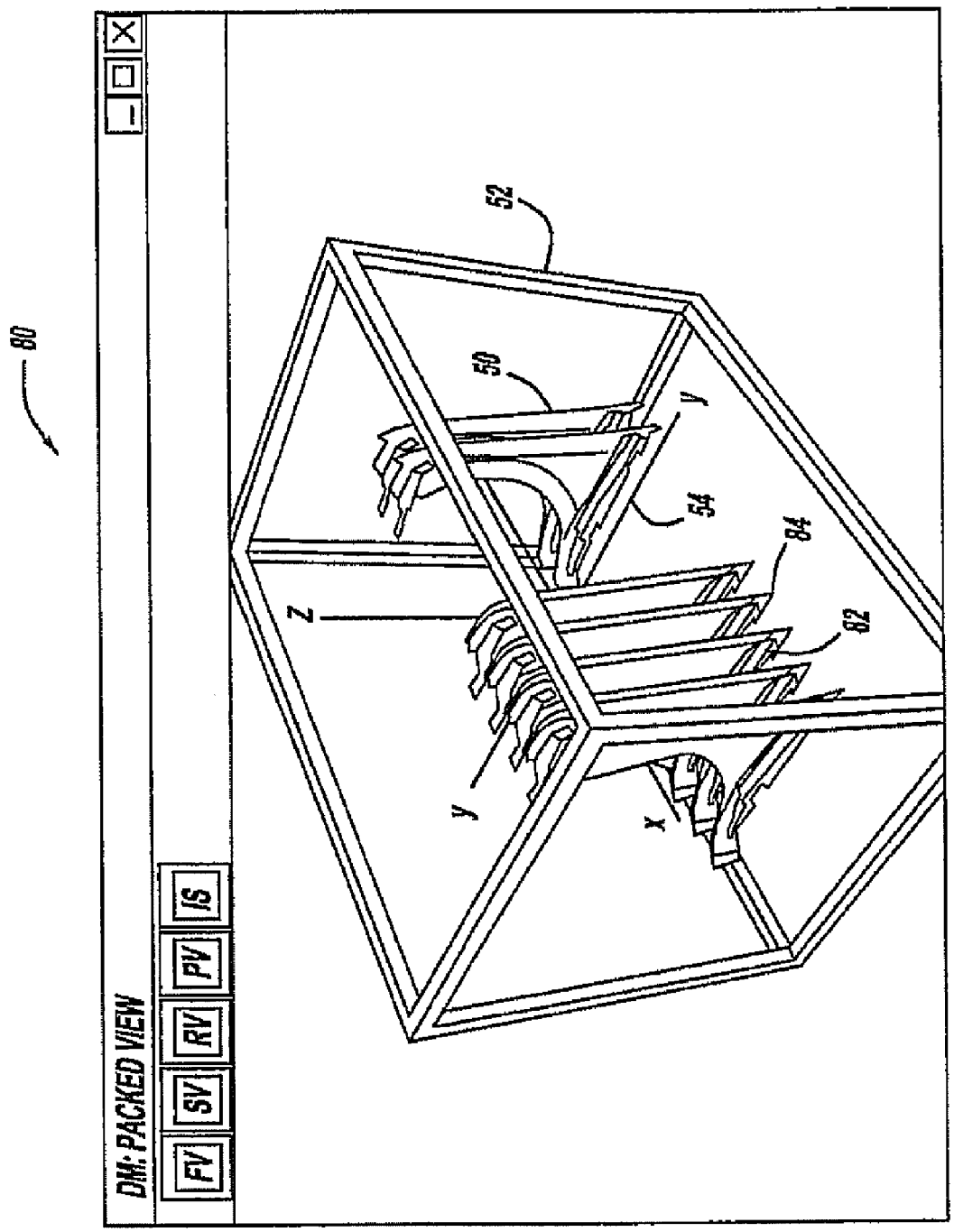

DENSITY ANALYSIS

BASE DENSITY | CONSTRAINT TRIMMED DENSITY | MULTI LEVEL CONSTRAINT TRIM

PART FIT
- FIRST PART FIT IN RACK: YES, PART SMALLER BY (73.679, 14.739, 9.347) INCHES
- SECOND PART FIT IN RACK: YES, PART SMALLER BY (—, 14.739, 9.347) INCHES

BASE DENSITY
- PARTS IN RACK: 12
- PARTS IN CONVEYANCE: 120
- RACK SPLITS: 111

DENSITY GUIDANCE
RACK SIZE INCREASE TO ADD MORE PARTS | RACK SIZE & MULTI RACK ID 0.703 21.551 39.165 | 96 62 69

DENSITY CONSTRAINTS (PART IDs): 8, 8 AND 8, 8

PART FIT
- PART FIT TEST

BASE DENSITY
- QUICK DENSITY
- OPTIMIZED DENSITY

TRIM
- TRIM CONSTRAINT
- UNDER TRIM
- FIND CONSTRAINT & TRIM
- MULTI LEVEL TRIM

STATUS
DONE: DENSITY ESTIMATE AT CURRENT STATE

FIG - 16

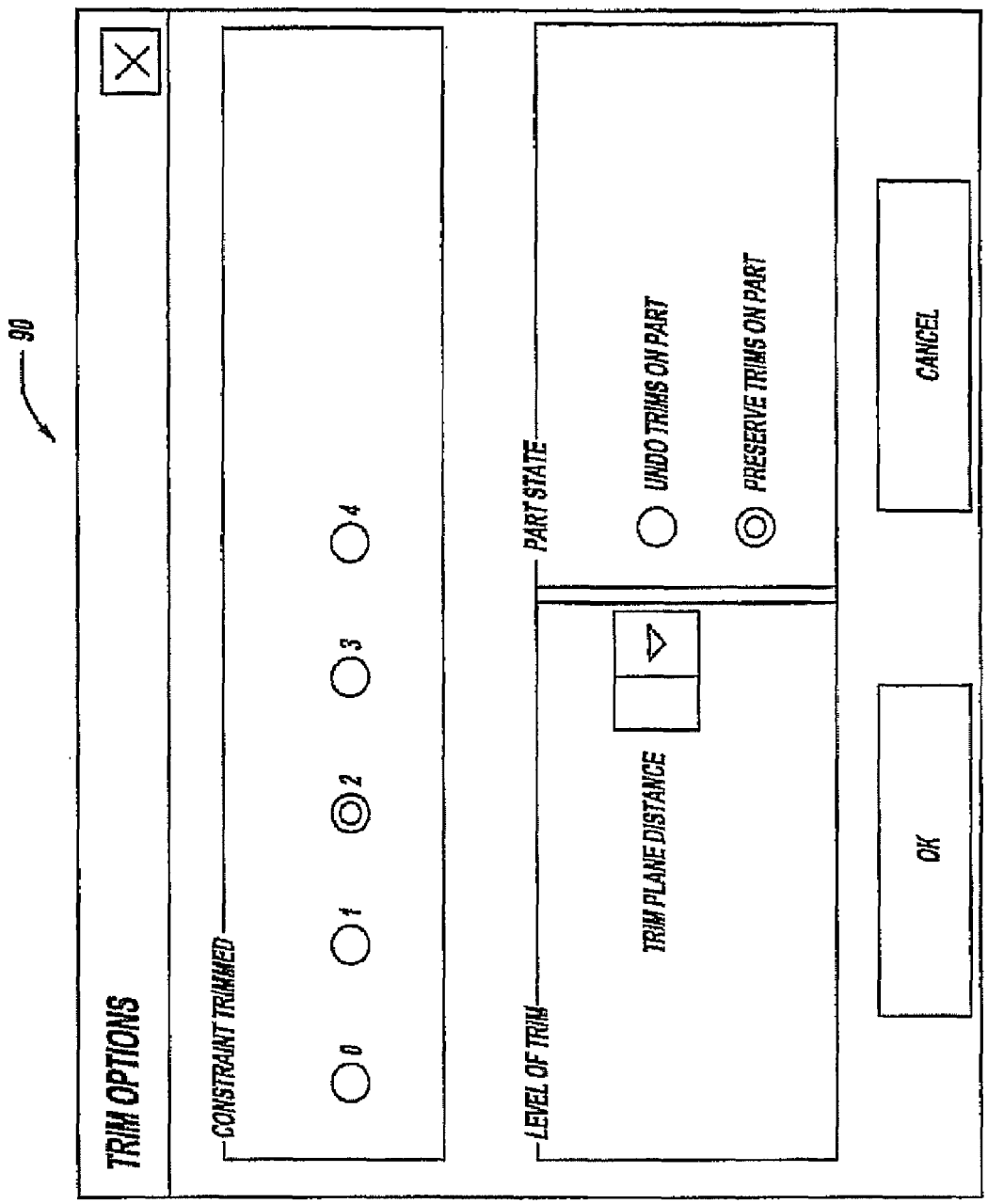

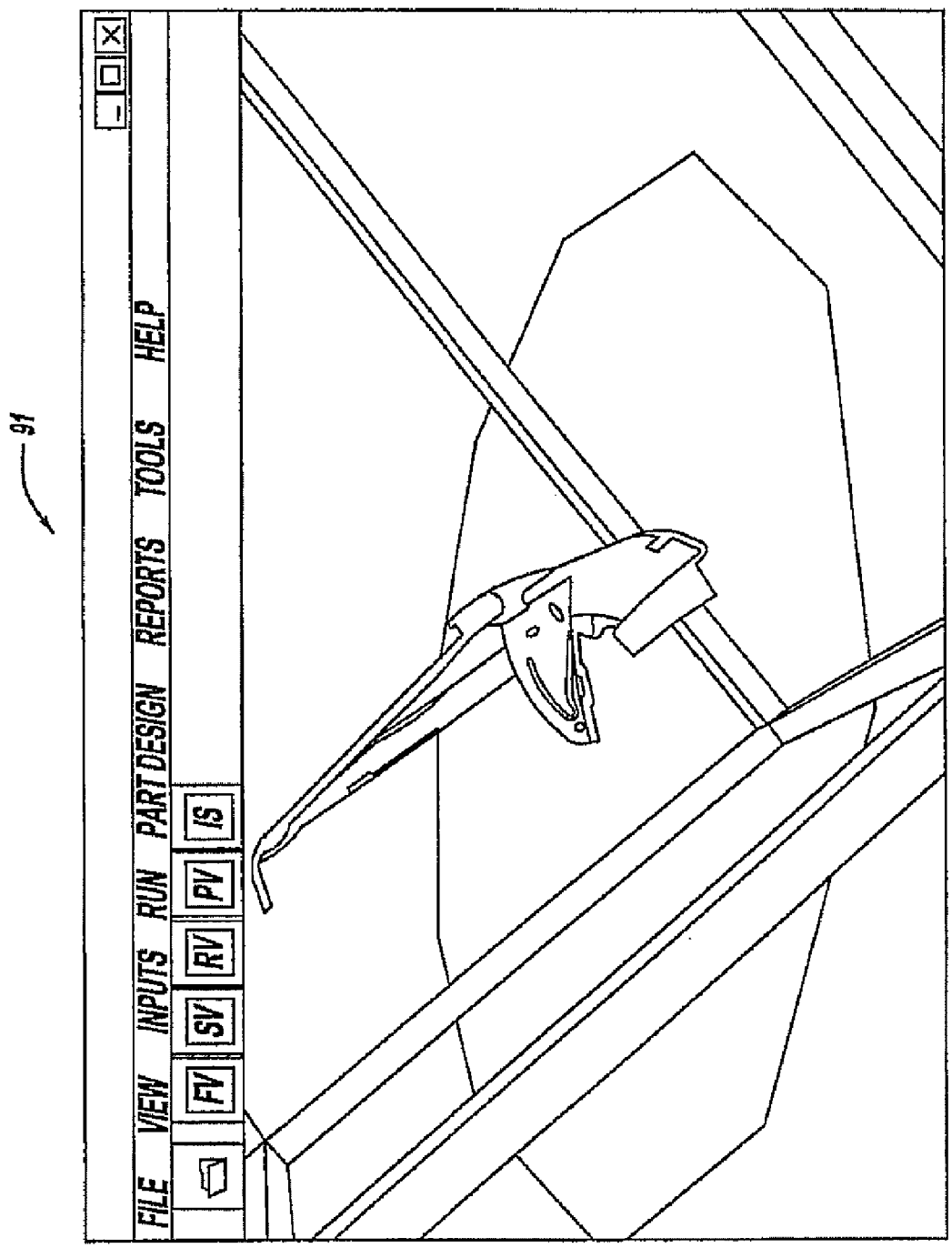

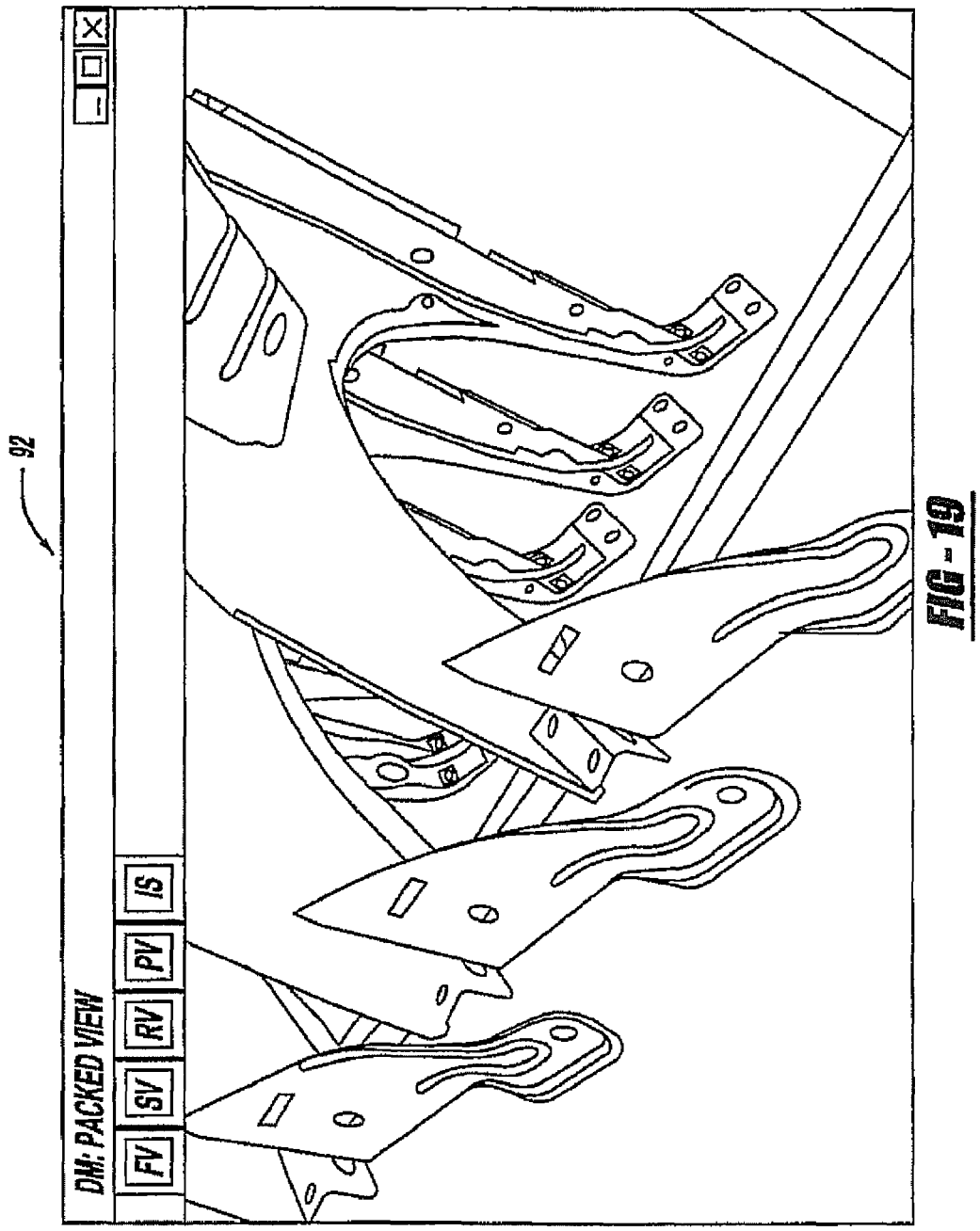

SYSTEM AND METHOD OF INTERACTIVELY OPTIMIZING SHIPPING DENSITY FOR A CONTAINER

CROSS-REFERENCE TO RELATED APPLICATION

This application is a continuation-in-part of U.S. application Ser. No. 11/229,082 filed Sep. 16, 2005 which is hereby incorporated by reference in its entirety.

BACKGROUND

1. Technical Field

The present invention relates generally to packaging of racked parts in a container, and, more specifically, to a system and method of interactively optimizing shipping density of racked parts.

2. Background Art

Manufacturers of products and especially products derived from assembled parts, frequently utilize individual parts that are fabricated at a different location than the assembly location. As a result, the individual parts are transported to the assembly location via a transport means, such as by rail, truck or air. Frequently, the parts are transported in a container. Depending on the size and shape of the individual part, a number of individual parts may be placed in a rack and shipped within the container.

A product, such as a vehicle, is assembled from a large number of component parts of various shapes and sizes. Most of the component parts are shipped into the assembly plant from another location. Various strategies are utilized to control inbound freight costs. One strategy is to reuse the containers. Another strategy is to increase the density of the parts shipped in each container.

In the past, manual techniques were utilized to determine the optimum number of parts, or density of parts, that could fit on a rack within the shipping container. For example, a manual estimate was made of rack density using a two-dimensional model. This estimate was typically based on previous experiences. The results of this analysis are utilized in determining the financial impact to the manufacturer, such as freight cost, container investment or the like. Therefore, any change to the shape and/or size of a particular component part could potentially affect the rack density, as well as the freight and container investment costs.

At the same time, computer-assisted design techniques are frequently incorporated in the development of a new vehicle, or redesign of an existing vehicle. These computer-assisted design techniques include Computer-Aided Design (CAD) software tools and enhanced visualization software tools that allow for interactive display and manipulation of large-scale geometric models. One aspect of the design process is to construct a geometric model of the proposed design using a technique known as Computer-Aided Design (CAD). The combined use of Computer-Aided Design and visualization techniques is especially beneficial in the design and analysis of individual component parts with respect to the overall product. Advantageously, potential vehicle model designs can be considered in a timely and cost-effective manner by analyzing a digital representation of a proposed design, versus preparing a physical prototype of an individual component, or the vehicle, or a portion thereof. In the past, container designers sometimes used the three-dimensional CAD model to analyze the shipping density of the component part in a two-dimensional environment.

While the current manual methods of approximating shipping density provide a solution, it may not be an optimized solution. The current methods are time consuming and there may be inconsistencies across various product lines. Thus, there is a need in the art for a system and method of automatically approximating the shipping density of component parts within a container, and quantifying the financial effect of part shipping density for the product.

SUMMARY

Accordingly, the present invention is a system and method for interactively optimizing shipping density of racked parts by a user. The system includes a user computer system, a communications network, a remotely located computer system, a data storage device, a computer-generated model of a component part, a computer-generated model of a container for transporting the component part and an executable shipping density optimization software program.

A design for density of racked parts in a container is preferably achieved with a generic, parametric driven analytical process. The parametric process allows for flexibility in design and engineering analysis of the model in a fraction of the time required using conventional analytical techniques. Various computer-based tools are integrated to achieve this enormous time and expense savings, including solid modeling, parametric design, and automated studies. In this example, the process is applied to a component part for a vehicle system, although other types of systems are foreseeable. The component part design and models thereof are typically generated through the use of conventional computer-aided design (CAD), including computer-aided manufacturing (CAM) and computer-aided engineering (CAE) techniques. In this example the component part is a fender.

The software program implementing the method integrates various software tools and expert knowledge to automatically approximate the shipping density, or parts per container and transportation conveyance of new model parts. The methodology quantifies the effect changes, such as to the component part or on part density, will have on the associated costs. The method takes advantage of the automated process to optimize rack density in a container irrespective of the expertise of the user.

The methodology includes the steps of the user selecting the component part model and container. The methodology also includes the steps of analyzing the shipping density of component parts within the container. The methodology further includes the steps of identifying a bottleneck feature and modifying the bottleneck feature and determining the optimized density of the modified component parts in the container.

One advantage of the present invention is that a system and method of interactively optimizing shipping density is provided that integrates available software tools with engineering knowledge and best practice guidelines for shipping a component part. Another advantage of the present invention is that a system and method of interactively optimizing shipping density is provided that automates the packaging planning process to improve the density efficiency of individual racked parts in a container. Still another advantage of the present invention is that a system and method of interactively optimizing shipping density is provided that reduces associated costs. A further advantage of the present invention is that a system and method of interactively optimizing shipping density is provided that analyzes a digital representation versus a physical prototype. Still a further advantage of the present invention is that a system and method of interactively optimizing shipping density is provided that is simpler to use and reduces the amount of time required to evaluate various design proposals. Yet still a further advantage of the present invention is that a system and method is provided that identifies a feature on a component that may influence packaging density, and allows for modification of the feature and evaluation of the effect of such change. Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is a diagrammatic view of a system for use in conjunction with a method of interactively optimizing shipping density for a container, according to the present invention.

FIG. 2 is a diagrammatic view illustrating the shipping density optimization software program, according to the present invention.

FIGS. 4A-4E are flowcharts illustrating a method of interactively optimizing shipping density using the system of FIG. 1, according to the present invention.

FIGS. 5-26 are diagrammatic views of a series of computer screens illustrating the implementation of the method of FIGS. 4A-4E using the system of FIG. 1, according to the present invention.

DESCRIPTION OF THE PREFERRED EMBODIMENT(S)

Figure 3:
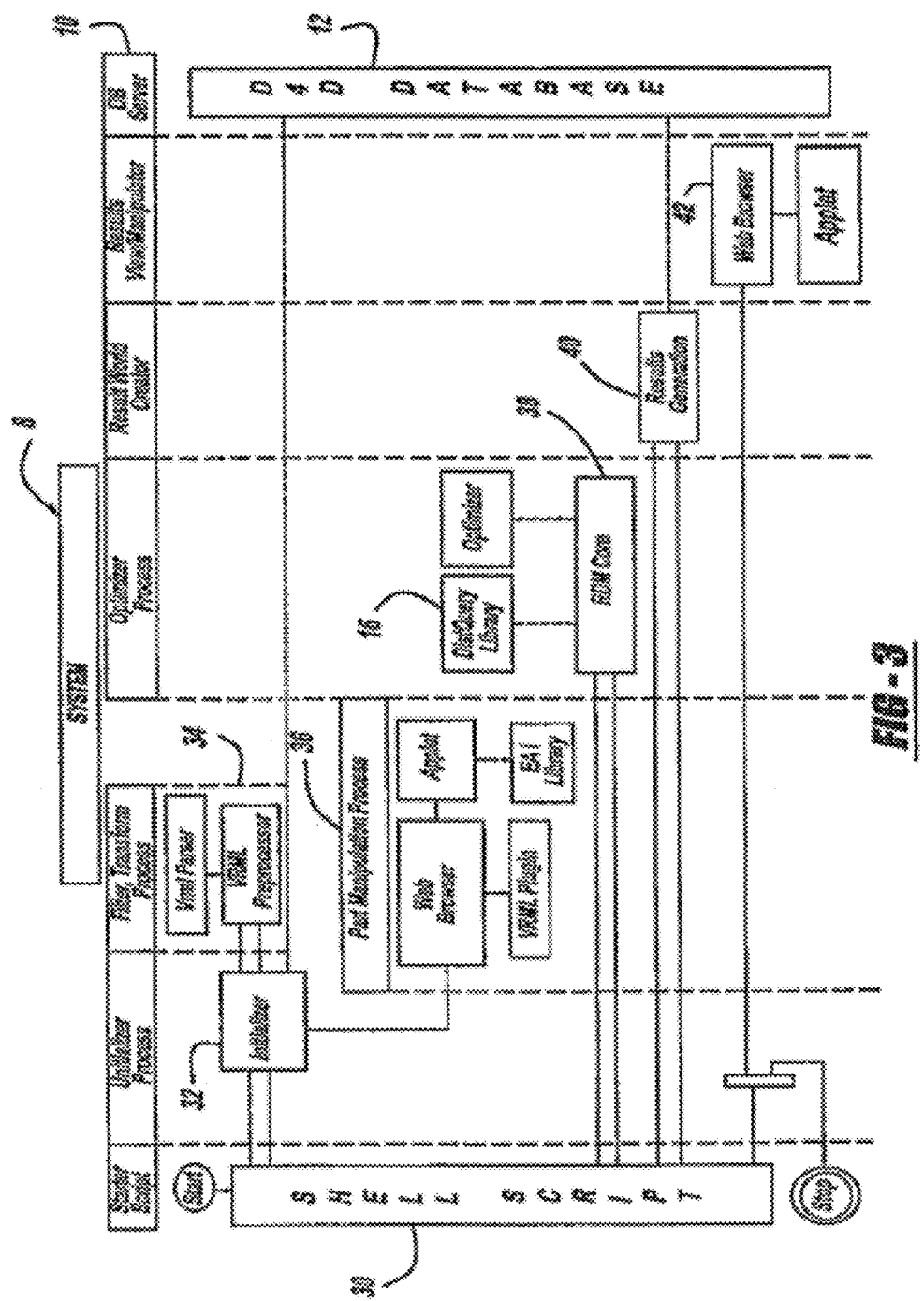
FIG. 3 is a diagrammatic view illustrating a method of interactively optimizing shipping density using the system of FIG. 1, according to the present invention.

Referring to the drawings and in particular to FIG. 1, a system 8 for interactively optimizing shipping density of a component part in a container is provided. In this example the component part is stored on a rack, and the rack is placed in a container. The choice of container is non-limiting. The containers are transported via a shipping means, such as air, train, truck, boat or the like. The container could also be integral with the shipping means. The system 8 includes a remotely located computer system 10. The remotely located computer system 10 includes a server having a processor, and a memory. The remotely located computer system 10 is in communication with a user computer system 22, to be described, using a communications network 20. The communications network 20 may be of any type, such as wired, or wireless without limitation. In this example, the communications network utilizes an internet, such as the Internet, or an intranet, or the like to transfer information.

The remote computer system 10 includes an electronic storage device or information database 12 in communication with the server. The database 12 may include information such as product design, assembly, manufacturing rules and guidelines, or the like. The information may be stored within a knowledge-based library associated with the database 12. The information may provide guidelines relevant to the methodology, such as to how to orient a component in a rack, spacing between components, or a type of rack for a particular component.

The information database 12 may also provide information to an engineer regarding a particular rack design. The database may further include information, such as standards, technical specifications, guidelines, practices, or the like. The information within the database may be organized into a subject matter based library. For example, a packaging library may be available which details the specifications for a rack, or contain a geometric mesh model of the package. Examples of packaging practices include criteria for positioning a component in the rack. Other packaging practices provide guidelines relating to how a particular component is oriented for shipping.

The information database 12 may also contain information in electronic form regarding various subsystems, such as a component parts library cataloguing the particular component parts used on a vehicle. Other information may reference predetermined product assumptions regarding the vehicle to be produced, such as model year, style, or production volume.

The computer system 10 also includes a component part model database 14, preferably stored on an electronic storage device. In this example, the component part model database 14 contains computer models, or math-based representations, of individual components part for use in the vehicle. The models may be stored in a CAD or mesh format or the like. For example, the model database 14 may include mesh modeling data for a component part, including minimum and maximum mesh size. It should be appreciated that the component part model database 14 may be integral with the information database 12.

The system 8 may also include various Computer-Aided Design (CAD) tools 16, which may be used by the method, to be described. CAD design tools 16 may encompass solid modeling, surface modeling visualization or parametric design techniques. Several modeling programs are commercially available and generally known to those skilled in the art. The parametric design technique is used in the electronic construction of geometry for designing the vehicle or a portion thereof.

The system 8 also includes various computer-aided engineering (CAE) analysis tools 16. One example of a CAE analysis tool is a preprocessor used to convert a CAD model into a geometric mesh model. Various commercially available software programs are utilized, such as EASICRASH, SOFY, MCRASH, Moedit, HYPERMESH or the like. The selection of the software tool is dependent on the capability of the particular software tool and the component part being analyzed. Another example of a CAE tool is an external distance query library, also referred to as a proximate query package (PQP). The proximate query package includes queries that are specialized in collision detection and distance computation for a geometric model. Various commercially-sold software products are available to perform collision detection and distance computation, among which are PQP, V-Clip, and SWIFT++.

The system 8 includes a user computer system 22, having a processor, and a memory shown at 24a to process information relevant to the method for interactively optimizing shipping density for a container. The user computer system 22 includes a display device 24b, such as a display terminal, to display information to the user 26. In this example, information is displayed on the display device 24b in a series of screens, also referred to as a browser. Examples of such screens are illustrated in FIGS. 5-26. A user 26 inputs information into the user computer system 22 when prompted to do so. The information may represent different alternatives. Selection and control of the information within a screen can be achieved by the user 26, via a user interactive device 24c, such as a keyboard or a mouse.

An example of an input method is a drawing technique used to draw a box around a local region of the model using the user interactive device 24c, such as the mouse. It should be appreciated that the drawing process includes a click, drag and release of the mouse, as is understood in the art. Another type of input method is a graphical user interface that allows menu selection, parameter modification and performs other types of viewing operations using the user interactive device 24c. Still another example of an input method is a pop-up dialog box containing available information or instructions. Preferably, the user computer system 22 is configured to provide for fast display capability for rendering and viewing of large, complex digital representations.

A shipping density optimization computer software program 18 utilizes the set of information or instructions from the user 26, information from the database 12, 14, design tools and analysis tools 16, to carry out the method to be described of interactively optimizing shipping density for a container. The shipping density optimization computer software program 18 is implemented by the user 26, and may be resident on the user computer system 22 or the remote computer system 10.

The shipping density optimization software program 18 may include executable modules for implementing the software program. An example of such modules is illustrated in FIGS. 2 and 3. It should be appreciated that other modules may also be utilized. In block 30, the module is a Virtual Reality Modeling Language (VRML) browser, which is an open standard for 3D models. The VRML browser includes features which interact through embedded scripts and external applications, as well as exchange or interact with 3D models via the Web. Most CAD systems also support the export of native CAD models, such as VRML. The VRML browser may be a plug-in to a web browser, and used to visualize VRML worlds.

In block 32, an initializer module is illustrated. This module is typically the first application module launched by the user 26. Various user selected options, such as component part and container selections, are specified using this module. The initializer module 32 creates a VRML world composed of computer models of the selected component part and rack. It should be appreciated that many of the selections and other data may be obtained from the databases 12, 14.

In block 34, a VRML preprocessing module is illustrated. The VRML model is organized as nodes. Several types of nodes may be utilized and they may be arranged in a hierarchical manner. VRML geometry is represented as nodes of geometric data acted upon by a set of nodes of transform data. The set of transforms are all the predecessor transform nodes of the geometric node. The VRML data may have a complex hierarchy of transforms. The VRML preprocessor transforms all the geometry into a single coordinate system. It also filters out unnecessary geometry, such as lines, curves or points, or the like.

In block 36, a part manipulator module or applet is illustrated. The part manipulator applet 36 is hosted by a web browser, which loads the VRML plug-in to render the VRML World created by the initializer. The part manipulator module may receive additional user inputs. For example, the user may specify initial transforms, and interactively view its effect, and/or the user may specify optimized ranges for the transforms. The part manipulator applet is in communication with the VRML browser, and manipulates the component part model, using input from the user, to reposition the part models. Manipulation of the models may include any translation, rotation, or combination thereof in any one or more of the three orthogonal axes (x, y, z). It should be appreciated that transforms done on the component part model are recorded for later use by the Relational Data Model (RDM) core module 38.

In block 38, an RDM core module is illustrated. This module implements the core algorithms of the software program, to be described. In this example, the RDM core includes an external optimizer library and a distance query library. The RDM core tries several configurations of parts within the rack as possible outcomes. Configuration is defined as the combination of a linear position of each part relative to each of the x-, y-, and z-axes (position); and an angular position relative to each of the x-, y-, and z-axes (orientation). Each configuration is arrived at by applying an initial transform followed by a random transform. The random transform may be constrained by a specified optimizer range. For example, the angle by which the part model is rotated about one or more of the axes may be limited to a specified range.

For each configuration, the number of component parts that can be packaged in the rack is computed. This number is the "objective function value" for the optimizer. The objective function evaluation requires computation of the transformations required to completely specify a final packaged configuration (transforms for a prime pattern and to repeat it).

As part of arriving at a final packaged configuration for a given input set, the core uses the external distance query library 16. The library supports fast minimum distance queries between two parts, each of which may undergo a rigid body transform between queries. A rigid body transform may consist of any combination of translations and rotations of the model in/about all three axes of a Cartesian coordinate system, or any equivalent combination of translation/rotation in three dimensional space, or as may be described in other, non-Cartesian, coordinate systems.

In block 40, a results generator module is illustrated. In this module, the RDM core results are interpreted and a VRML world of the packaged configuration is created. An output report is also generated that includes information, such as an estimate of the financial impact on freight and investment costs resulting from the change in container density.

In block 42, a results viewer and feature modifier module is illustrated. The results VRML is viewed and may be manipulated to modify the geometry of the model being worked with. The user interacts with the VRML result to modify features of the part that may limit or decrease the packing density with the objective of improving the final packing density. The user may select to return to another module as part of the interactive optimization process.

One example of a feature that may be modified to improve packing density is a flange or emboss on a sheet metal component part such as a vehicle floor pan. It may be possible to significantly improve packing density by changing the angle of a flange or decreasing the size of an emboss so that the parts can be "nested" more closely together during shipping. After the parts have reached their shipping destination, the part will undergo the necessary manufacturing step(s) to shape the flange to the angle called for in the original, pre-modified design. Such a modification will make financial sense if it is shown that the shipping cost reduction gained by the increase in packaged density exceeds the manufacturing cost incurred by performing the additional manufacturing step at the destination, as compared with forming the required part geometry at the point of origin.

Another example of a feature modification may apply in the case where the component part being analyzed is made up of two or more subassemblies. As used in this discussion, subassemblies are those portions or segments of component part 50 that are manufactured separately and assembled with one another to form the complete component part 50. For example, several subassemblies may be fastened together (by bolts, welding, etc.) to create component part 50. Analysis according to the present invention may lead to the conclusion that overall cost will be reduced if one or more subassemblies of the component part 50 are shipped to the destination separately (i.e. before being assembled with the rest of the component part) and assembled at that destination rather than shipping the component part in the fully-assembled state. In this case, the bottleneck feature is the subassembly and the "modification" is the removal or disassembly of the subassembly from the balance of the component part.

Another example of a feature modification is the removal of one or more fasteners that protrude from a surface of the component part. For example, the head of a bolt attached to the component part might protrude enough to require a substantial decrease in shipping density. In this case, the bottleneck feature is the bolt and the "modification" is the removal or disassembly of the bolt from the balance of the component part. The bolt will be shipped separately and installed in the component part at the destination.

The disclosed method provides the user with the expected financial impact of possible feature modifications, thus allowing the user to make an informed decision on how to ship component parts most efficiently.

Referring to FIGS. 4A-4E, flowcharts of a method of interactively optimizing shipping density for a container are illustrated. The software program for interactively optimizing shipping density may be resident on the remotely located computer system 10 and accessible by the user computer system 22, or resident on the user computer system 22. The methodology approximates the density of a model part in a rack or container, and quantifies the associated freight and container investment costs. In addition, the methodology evaluates the density impact of modifications to component part features. The methodology identifies a bottleneck feature and predicts the impact on container density, and associated freight and container costs, if the identified feature is removed or otherwise modified, for example reduced in size or moved to another location on the part.

Figure 4A:
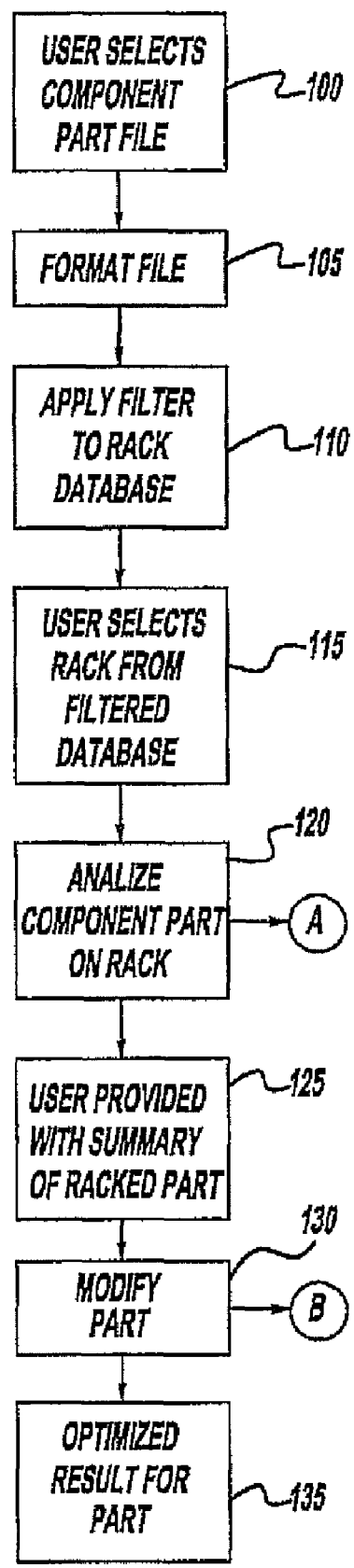
Figure 5:
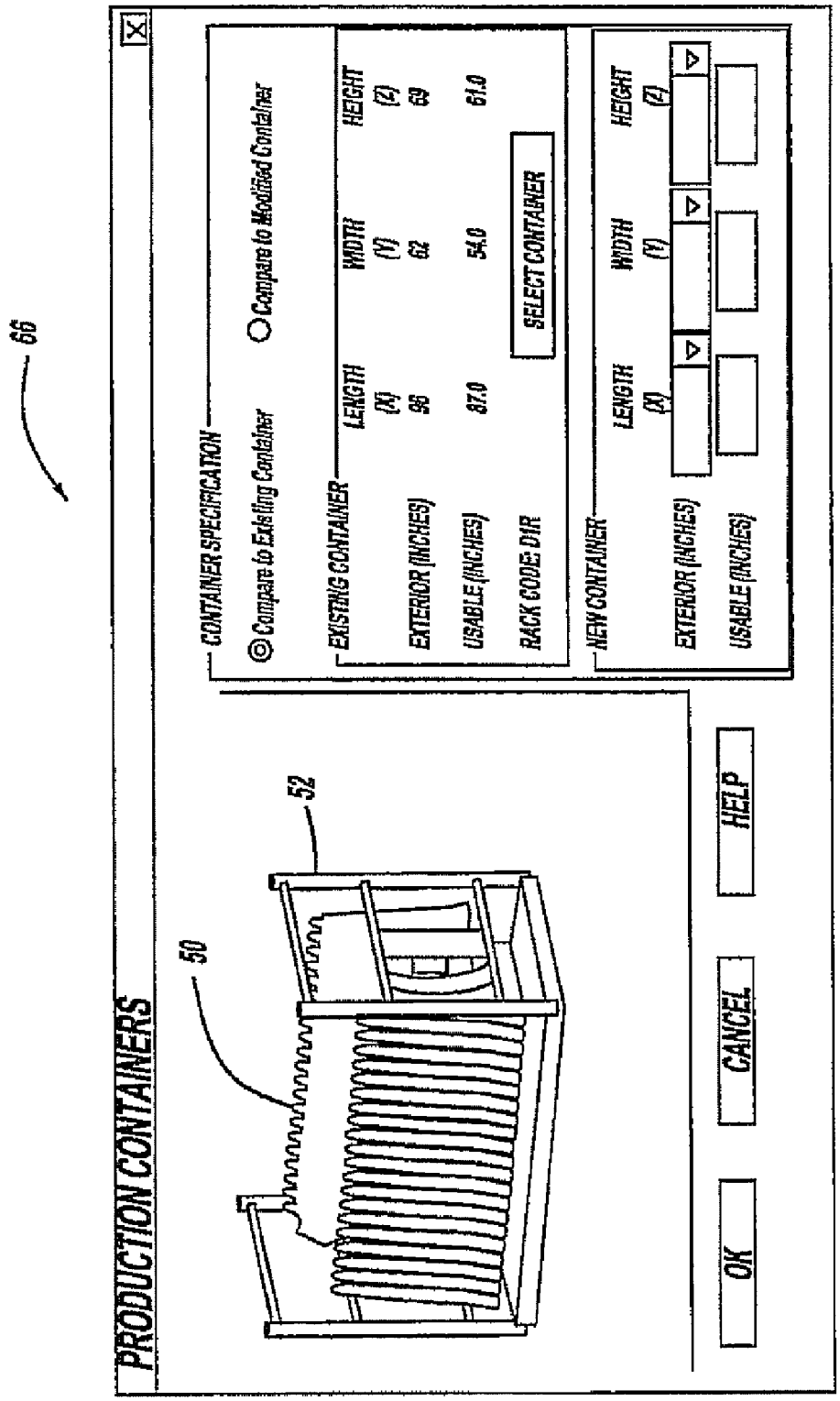

Referring to FIG-4A, the methodology begins in block 100, where the user 26 selects a component part for analysis. The component part may be an existing part or a modified part. By way of illustration, the component part 50 in this example is a fender panel. Geometric data for the component part 50 is imported into the executable computer software program. For example, the user 26 is provided a window or screen as shown in FIG. 5 at 66, and has the option of selecting a component part 50 from a list describing component starts stored in the database 14. The component part 50 may be stored in a variety of formats. For example, the component part 50 may be represented as a geometric model in a CAD format. Various CAD compatible formats may be supported, such as VRML, stl, or .jt or the like. The component part 50 may be converted from a CAD file into a mesh file using commercially available software, such as IDEAS or ANSA or HYPERMESH or the like. The mesh model of the component part 50 may also be stored in a library in the component part database. An advantage of storing component parts in a library is that different design programs for similar products can share a common library. This may result in a significant timesaving in preparing the mesh data. The methodology advances to block 105.

In block 105 the user selects other parameters or characteristics regarding the component part 50 for use in optimizing the rack density. For example, the user may identify subassemblies of the component part to use in the analysis, as shown in FIG. 6 at 68.

Figure 8:
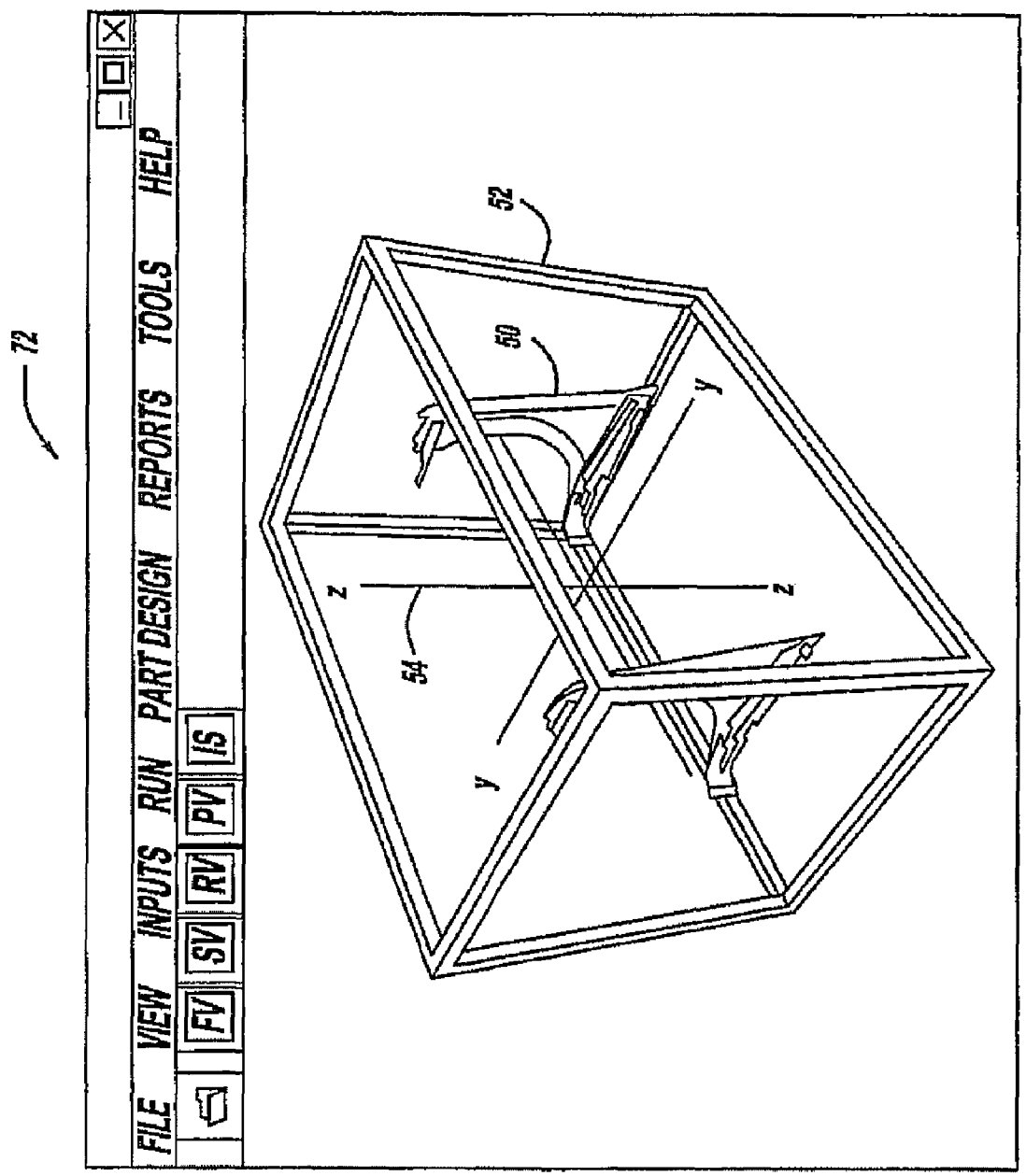
Figure 9:
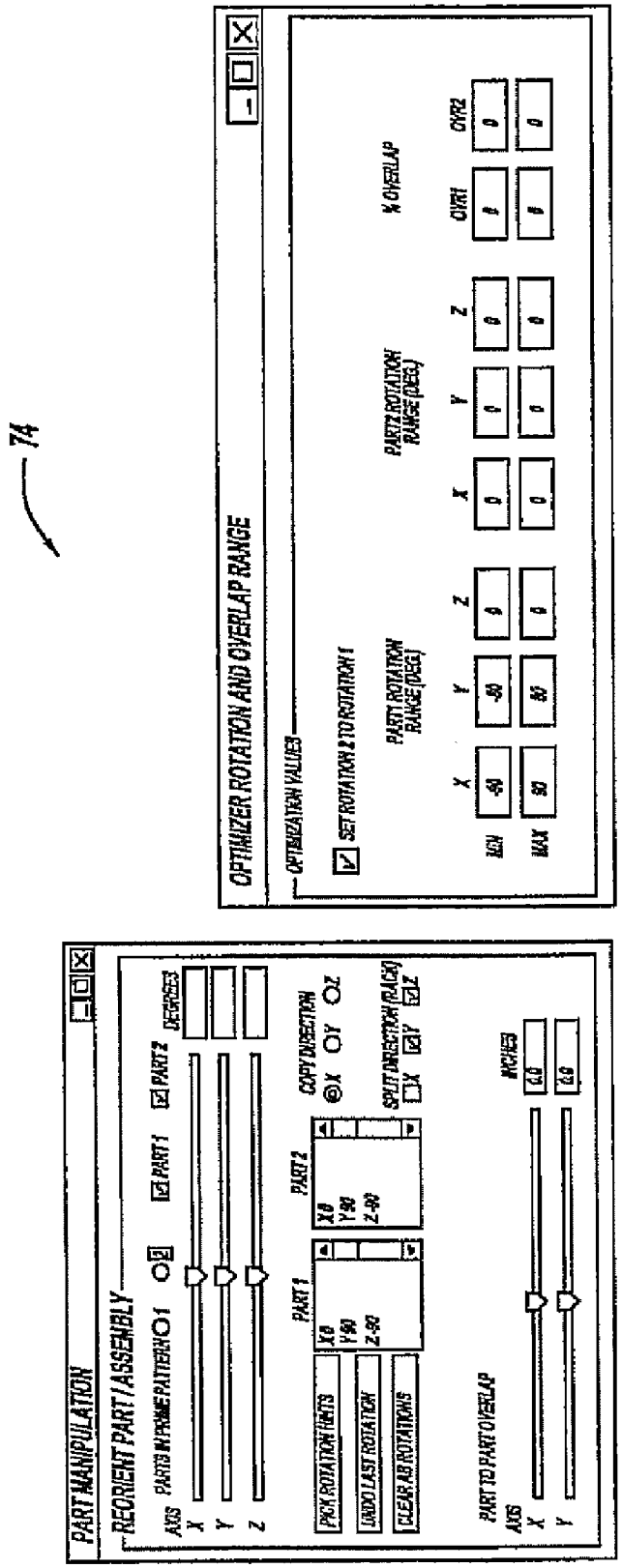
Figure 13:
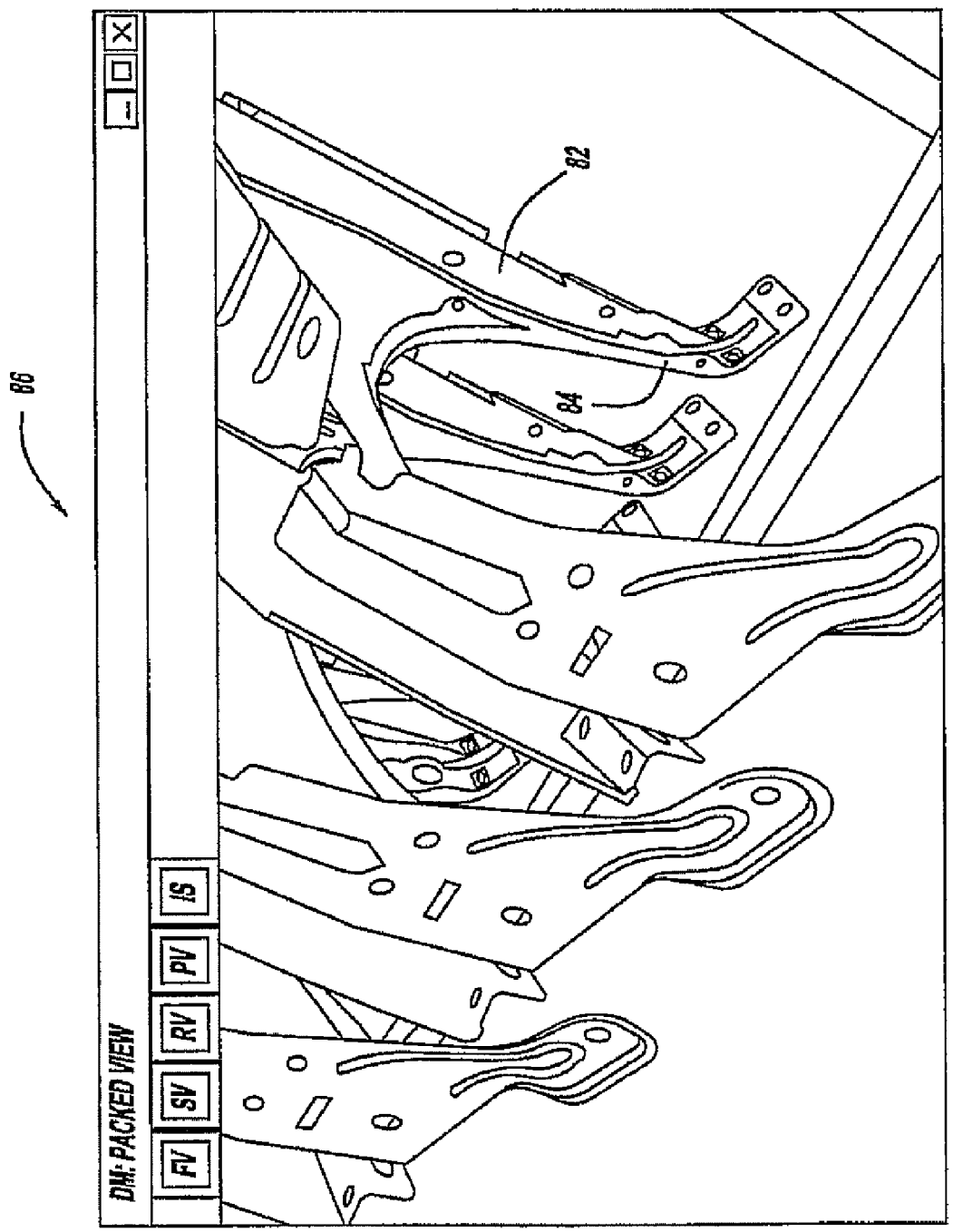
Figure 14:
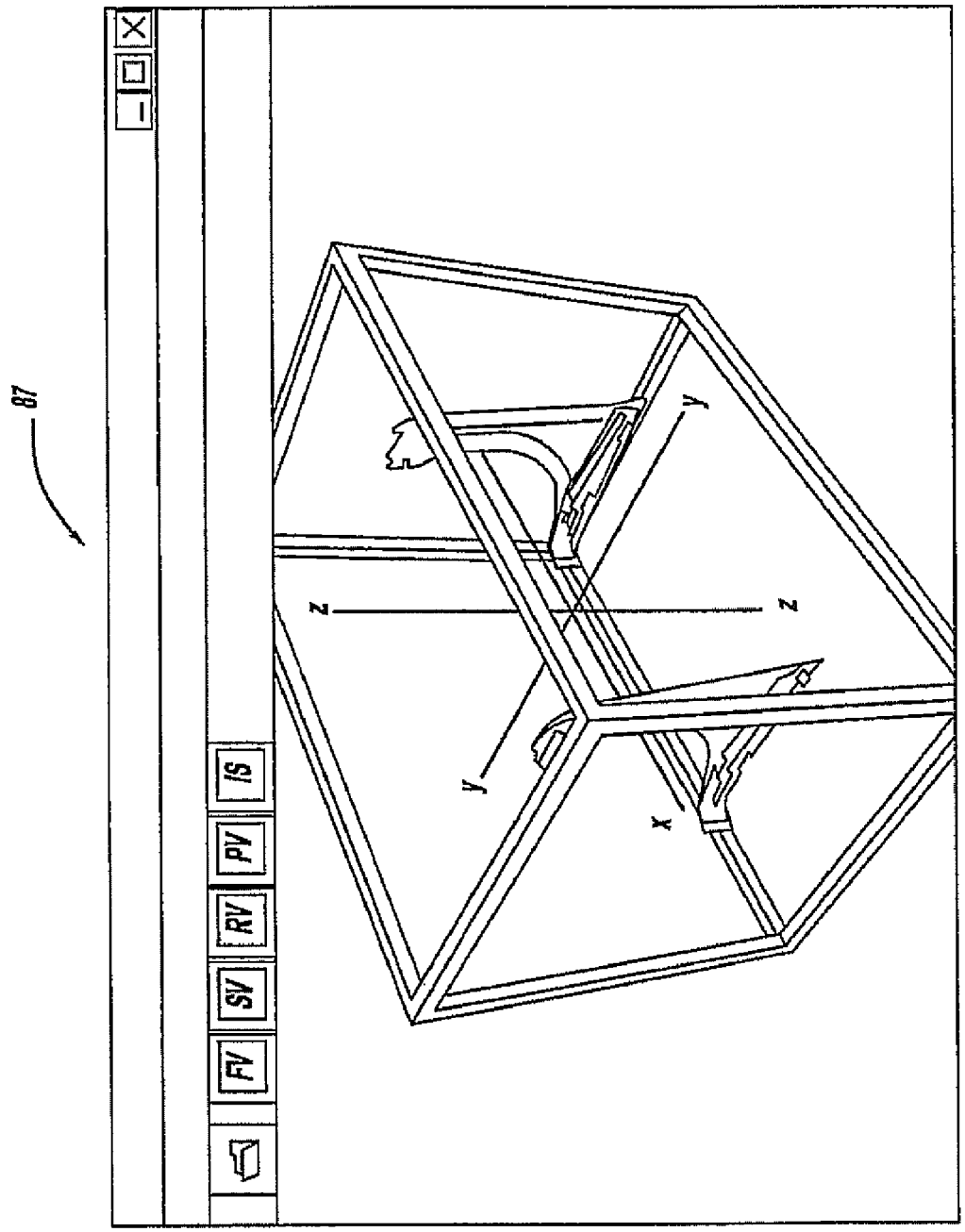
Figure 15:
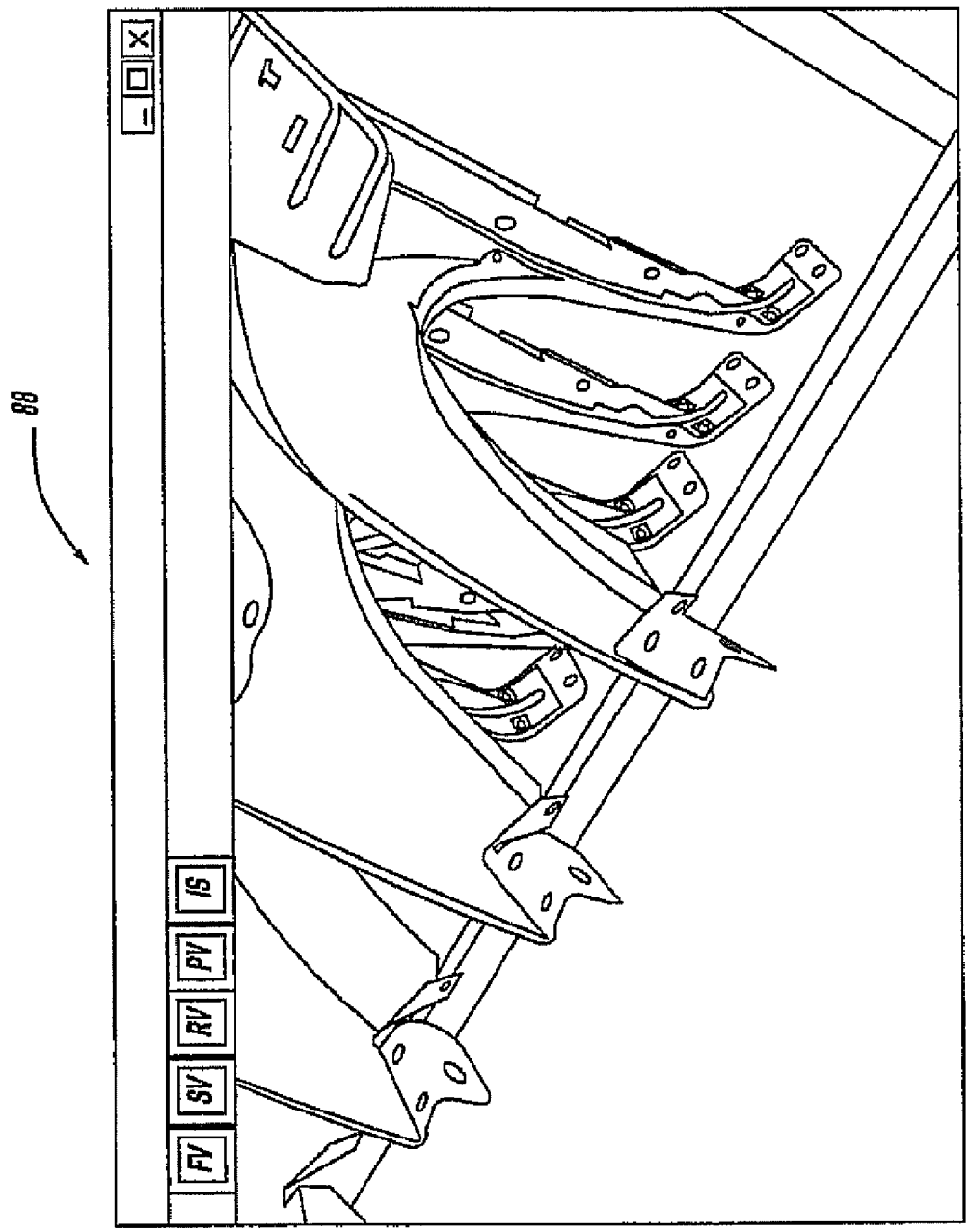
Figure 20:
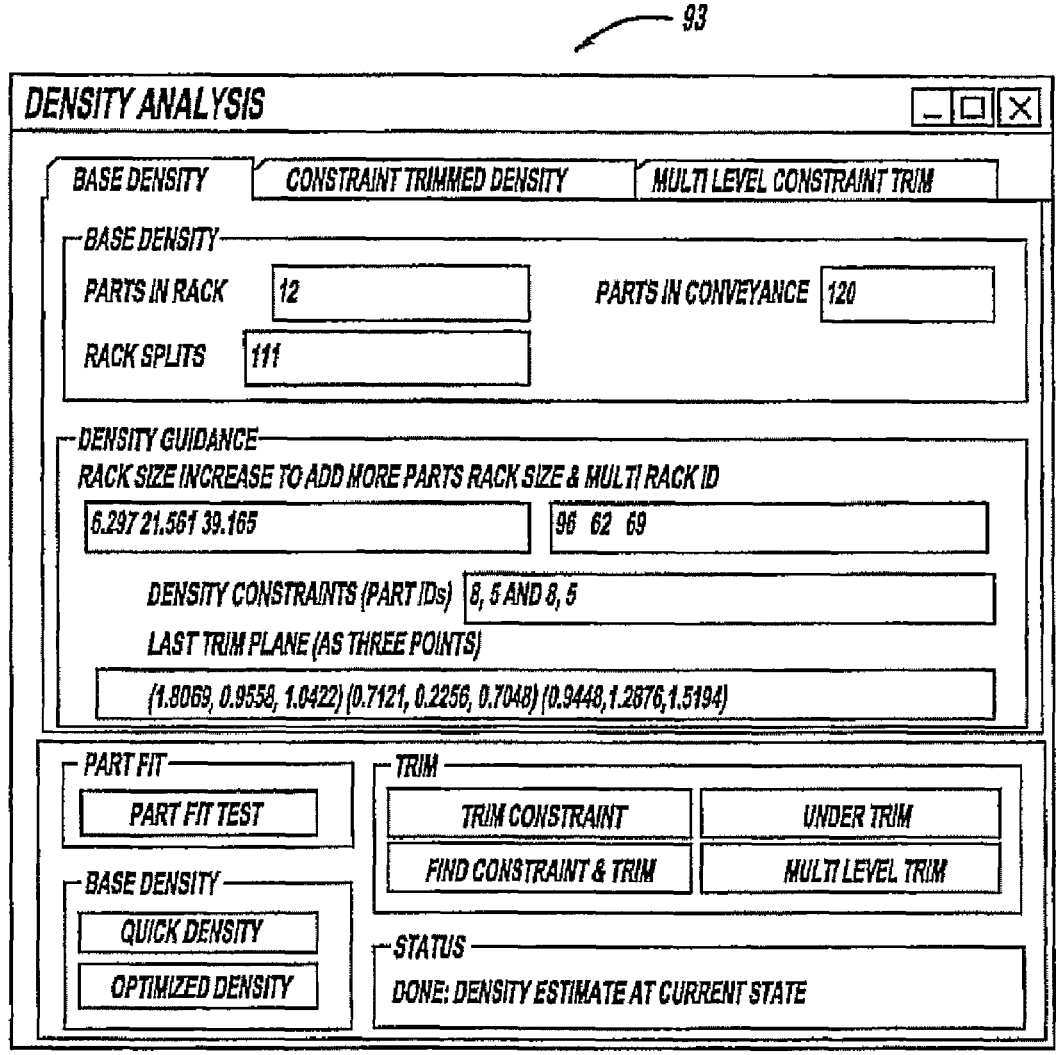

These parameters or characteristics may also include the initial component part orientation within the rack as shown in FIG. 8 at 54. The component parts may be arranged within the rack in various packaging configurations, such as single sided, double sided, top loaded, end loaded or the like. The user may select to view the selected orientation of the component parts. The user 26 is preferably provided a window on the display device 24b containing relevant parameters. Using the user input device 25c, the user 26 may highlight and select an option. The initial configuration of the multiple copies of the component part model is preferably made by the user based upon known constraints related to the packing and/or shipping of the component part in question. Known constraints may be based on engineering knowledge and best practice guidelines for shipping a component part.

For example, the minimum allowable inter-part clearance may be known for a particular category of part and/or a particular type of packing/dunnage to be used. This minimum allowable inter-part clearance may be based upon the sensitivity of that part category to damage or marring during packing, shipping, and/or unpacking of the parts. For example, parts that will be visible when in use by a consumer are, in general, more highly sensitive to even a small amount of cosmetic damage than parts that are strictly functional. Hence, such visible parts will generally be packed with a greater minimum allowable distance to reduce the likelihood of any cosmetic marring of the part. Similarly, the material and/or type of construction of the part are considerations in the minimum allowable distance, with easily damaged parts calling for a greater inter-part clearance than parts that are more robust.

The user may also use some degree of engineering knowledge, best practice guidelines, judgment, and/or experience in creating the initial orientation of parts. The user places the parts relative to one another in a manner that, in the user's estimation, provides an assumed volume-efficient use of the available container space. For example, generally flat or planar component parts such as the fender panel 50 will most likely be given an initial configuration wherein the adjacent parts are approximately parallel to one another. Component parts having non-planar or otherwise irregular shapes may be arranged in some other assumed volume-efficient configuration to similarly maximize the efficient utilization of space in the container.

It is to be understood that the terms "component part," "container," and "rack" (as well as the plural forms of those terms) as used in describing the present methodology refer to the computer, geometric, or mesh models used in or by a CAD program, those models representing the actual component part(s) and rack being analyzed.

Figure 7:
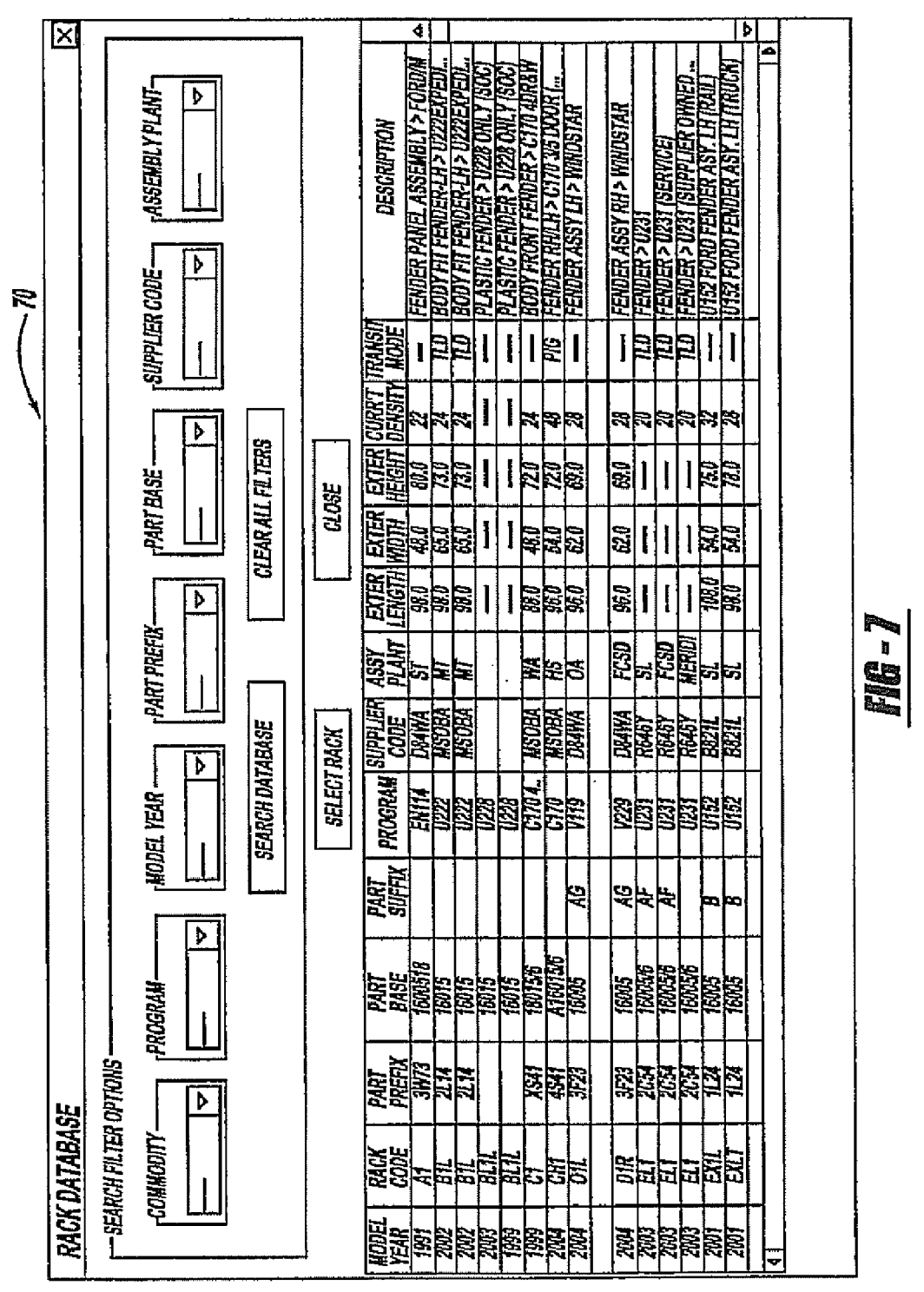

The methodology advances to block 110, and the user selects a filter option for selecting a rack from the rack database. These filter options are presented in a window, and the user utilizes a user input device to make a selection, as shown in FIG. 7 at 70. Examples of filter options include the type of transport mode, such as truck or rail. Other filter options may relate to costs. The user may also specify container dimensions, such as length, width or height. Other user selectable options include rack size or rack frame thickness. The user may also select a dimensional tolerance such as clearance between parts. The user may also select part orientation in the rack. After making these selections, the user uses the data input device 24c to choose a "select rack" option, which initiates a search of the rack database, and uses the selected filter options to identify available racks. As previously described, the rack database 12 is a database of available racks. The methodology advances to block 115.

In block 115, the user 26 selects a rack from the filtered list of racks. In this example, the user is presented with a screen displaying a list of racks that meet the previously selected criteria. Advantageously, this filtering process reduces the number of racks for analysis. The user may utilize a user input device to highlight and select the desired rack. The user 26 may select to have the selected rack displayed on the display screen, as shown in FIG. 8 at 72.

Figure 4B:
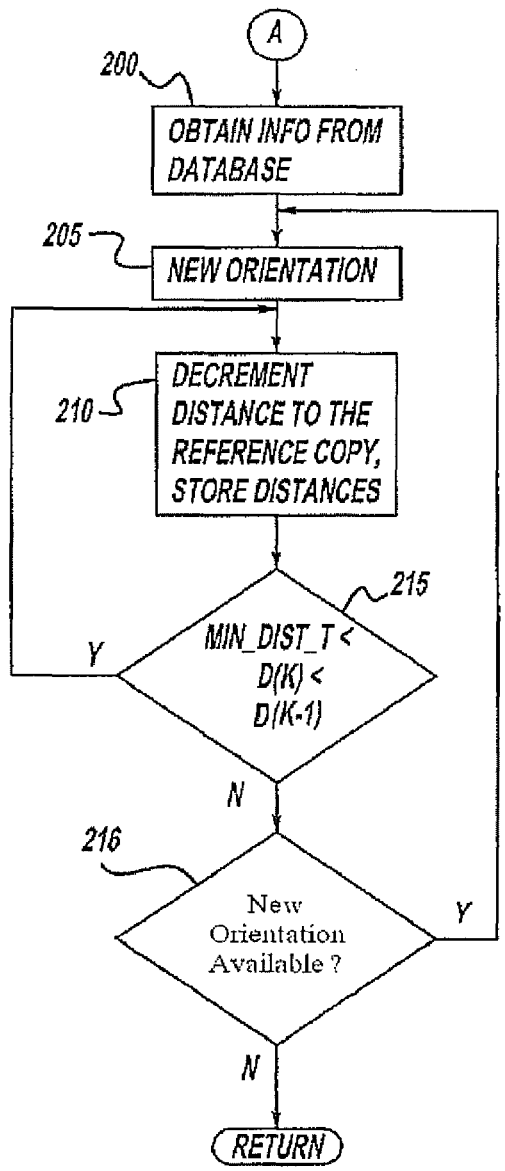

In block 120, the design density of the selected component part on the rack, and transportation conveyance is analyzed and the copies of the models are reconfigured within the container model and with respect to one another using an analytical optimization process described beginning in circle A of FIG. 4B. It should be appreciated that the density optimization methodology searches for the optimal position and orientation (which together define the configuration) of multiple copies of the selected part model in or on the selected rack 52. In general, the part density is the objective function to be optimized.

In this example, the analysis uses an external distance query library, referred to as a Proximate Query Package (PQP). The PQP library includes queries that are specialized in collision detection and distance computation for a geometric model. An example of a known PQP is UNC, developed by the University of North Carolina, GAMMA Research Group. After returning from circle A, the methodology advances to block 125.

In block 125, the optimized density results are provided to the user. The optimized results provide an estimate of rack, container and conveyance density, as well as associated transportation and investment costs for a given rack and container. The results may be displayed as a window on the display screen, as shown in FIG. 11 at 78, FIG. 12 at 80, FIG. 13 at 86, or FIG. 14 at 87. The results may include information such as optimized number of parts per rack, financial impact, container size, part configuration, and clearance between parts or the like. Various aspects of the rack density can be illustrated, including number of racked components, rack size, or potential areas of improvement. A color-coding system may be utilized to visually indicate to the user 26 the status of the rack density for a component part. For example, a feature on the component part that restricts the further increase the number of racked parts (limits the part density), referred to as a bottleneck feature, may be indicated. For example, problem areas may be visually illustrated on the display device 24b in red, caution areas in yellow, and acceptable areas in green.

Once the optimum part density has been identified, the methodology advances to block 130 and evaluates the impact of modifications to the identified bottleneck feature. The methodology advances to circle B in FIG. 4C (to be described). The methodology returns and advances to block 135. In block 135, the user 26 is provided with a summary of the impact of modifying the component part for further analysis. This analysis predicts the impact on container density of modifying the identified bottleneck feature. A new optimized result with the bottleneck feature removed or modified provides an estimate of container and conveyance density for a given container.

Referring to FIG. 4B, a methodology for optimizing density of the component part on the rack by manipulating copies of the computer models begins in circle A and continues to block 200. In block 200, the methodology obtains information regarding the component part and selected rack. The methodology may utilize the information previously selected by the user from the corresponding databases. Other inputs from the user may also be considered. An example of a screen for selecting rack parameters is illustrated in FIG. 10 at 76.

The methodology advances to block 205 and the initial configuration of the component part in the rack is selected. The user may define the initial configuration, in accordance with the considerations described elsewhere herein. Alternatively, the initial configuration may be determined automatically using the software program which may select a preferred configuration for a particular category of part based upon historically and/or programmed information, as shown at 74 in FIG. 9, and at 87 in FIG. 14.

The methodology advances to block 205 and the initial configuration of the component part in the rack is selected. The user may define the initial configuration, in accordance with the considerations described elsewhere herein. Alternatively, the initial configuration may be determined automatically using the software program which may select a preferred configuration for a particular category of part based upon historically and/or programmed information, as shown at 74 in FIG. 9, and at 87 in FIG. 14.

Next, the initial minimum distance $d(k-1)$ between the copies of the component part model is decremented by a predetermined amount. That is, the two copies of the component part model are reconfigured, or "moved," closed to one another. The amount by which they are moved may be $(d-Min\_Dist\_T)$, where $Min\_Dist\_T$ is a predetermined minimum allowable clearance between the parts. The decremented distance is stored in the database as $d(k)$.

The methodology advances to decision block 215, and it is determined if a predetermined minimum allowable clearance between the parts $Min\_Dist\_T$ is less than decremented distance $d(k)$, and also if $d(k)$ is less than the minimum distance $d(k-1)$ from the previous (initial) iteration. It should be appreciated that the previously described proximate query package (PQP) is utilized to calculate the decremented distance $d(k)$ for this iterative optimization analysis. If the condition in block 215 is satisfied, i.e. the predetermined minimum allowable clearance $Min\_Dist\_T$ is less than the decremented distance $d(k)$ and $d(k)$ is less than the previous minimum distance $d(k-1)$, the methodology returns to block 210 and continues to iteratively optimize density of the part in the rack by decreasing or decrementing the distance between the copies of the component part model.

It should be understood that after each iteration of reconfiguring the copies of the part model, the minimum distance d is recomputed for the parts in the new configuration.

If the condition in block 215 is not satisfied, the methodology advances to block 216 and determines if there is another possible orientation of the two copies of the model in the rack. The number of possible orientations may be limited by a user-specified range from which the optimizer must select. If YES, the methodology returns to block 205 and continues to optimize the location of the component parts by selecting a new orientation. If the condition in block 216 is not satisfied, i.e., all possible orientations have been exhausted, the density of the component part is optimized in the rack, i.e., $d(k)$ in the final iteration is the minimum part distance that can be achieved for all possible orientations, the methodology returns to block 120 of FIG. 4A and continues. It should be appreciated that this algorithm is applicable when all the distances between the corresponding points on the mating boundaries are available, and not just the minimum distance between the boundaries of two solid objects.

Figure 4C:
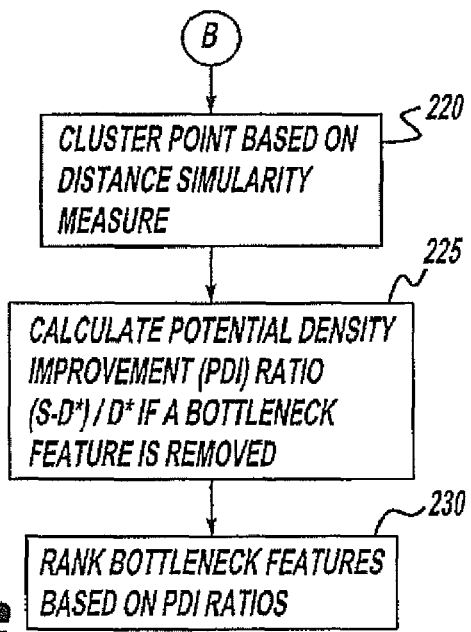

Referring to circle B of FIG. 4C, the methodology analyzes the effect of reducing in size or eliminating the bottleneck feature or features on rack density using the minimal distance between two copies of the part when called for from block 130 of FIG. 4A. The methodology of FIG. 4C utilizes clustering to identify the primary, secondary and, if desired and necessary, subsequent order bottleneck features by considering the similarity of the points of two mating surfaces. For a solid part, the methodology analyzes the relationship between a virtual cut of the bottleneck feature and the related shrinking of a bounding box 56 (see FIG. 25). A bounding box is a hypothetical box of minimum size drawn to completely enclose the two adjacent copies of the component part model. The shrinking of the bounding box achieved by elimination or reduction in size of the primary bottleneck feature is compared with the shrinking of the bounding box achieved by elimination or reduction in size of the secondary bottleneck feature (and so on for subsequent order bottleneck features) in order to determine the relative density improvement due to removing or reducing the primary, secondary, and subsequent order bottleneck feature.

Figure 21:
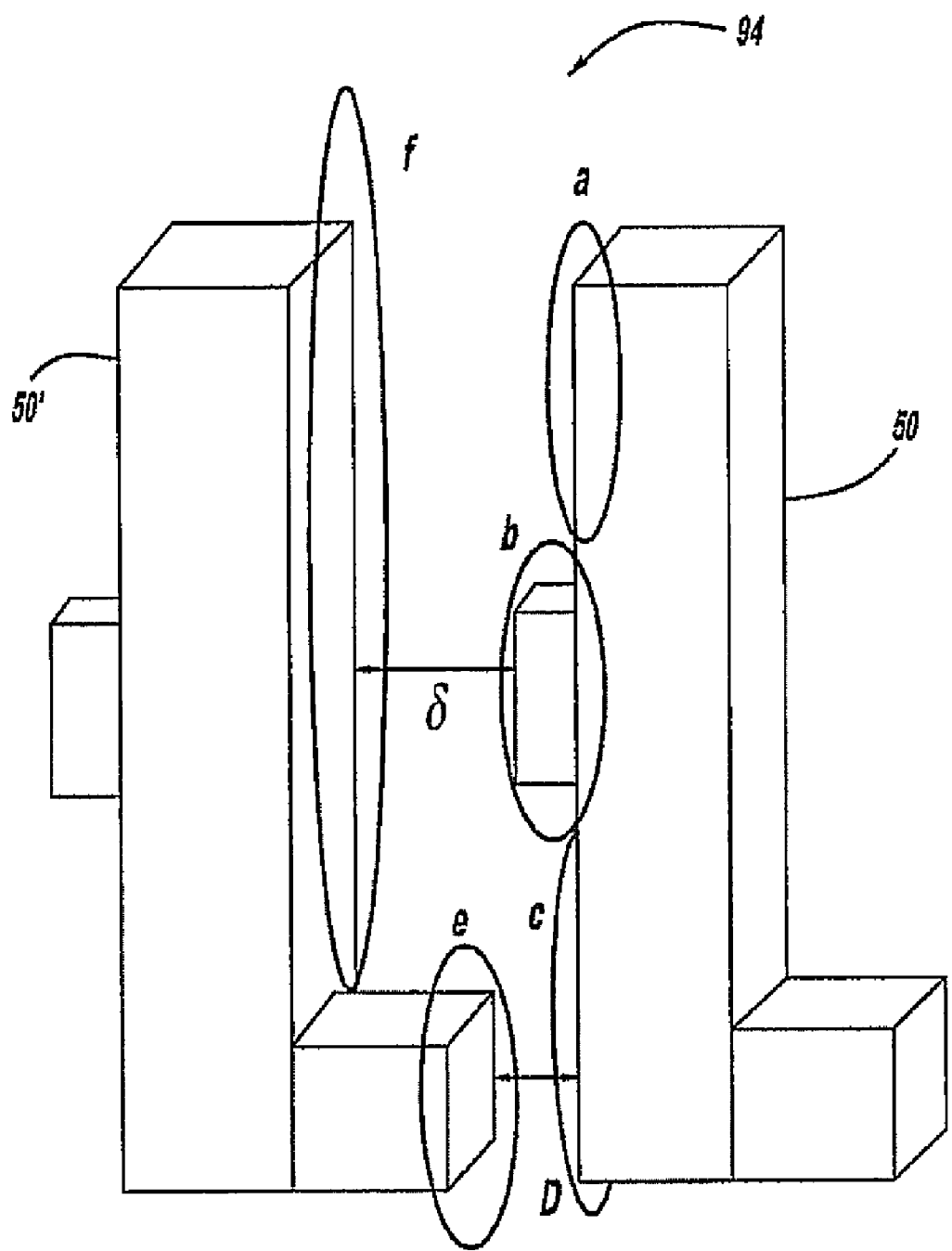
Figure 22:
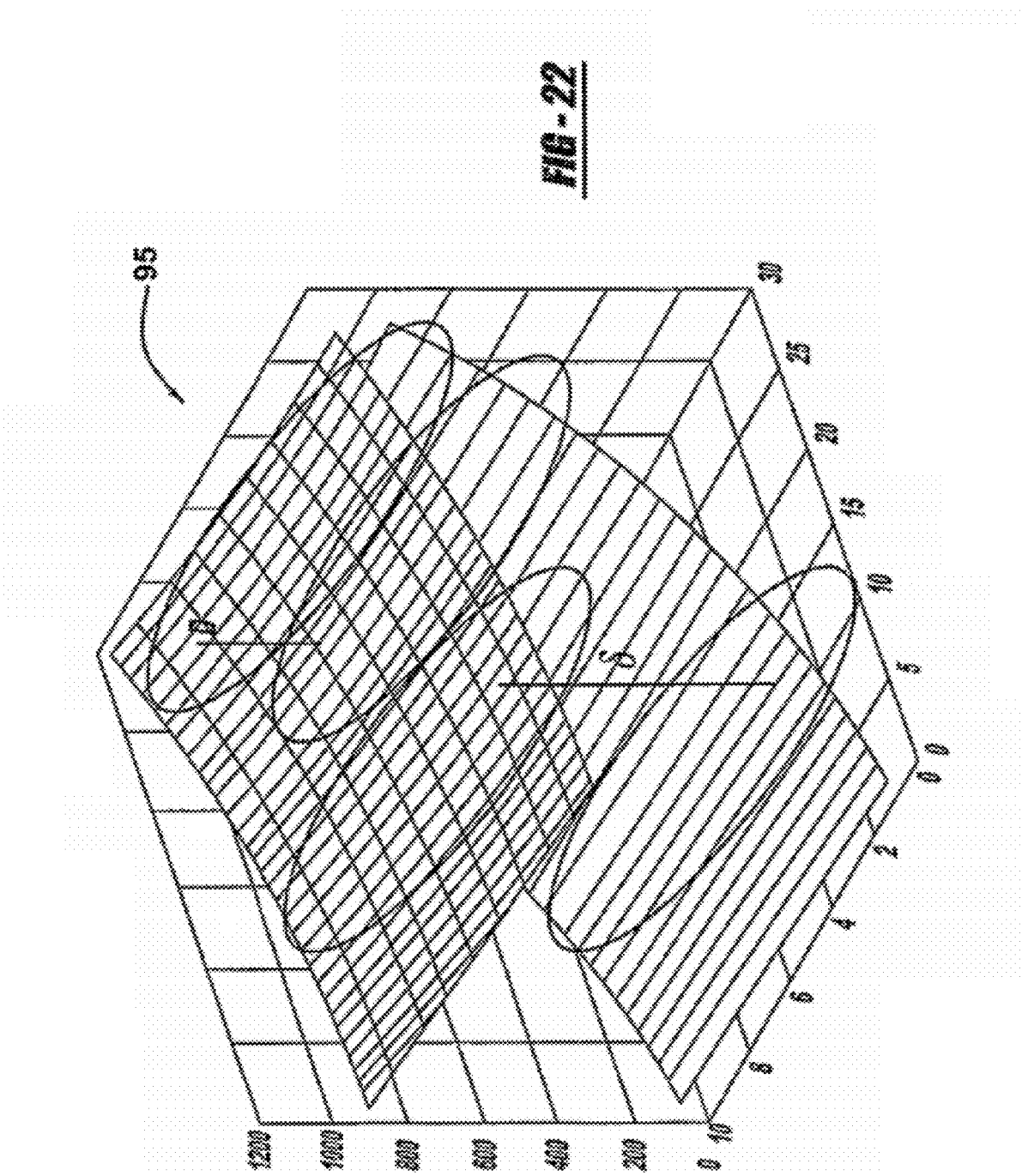
Figure 23:
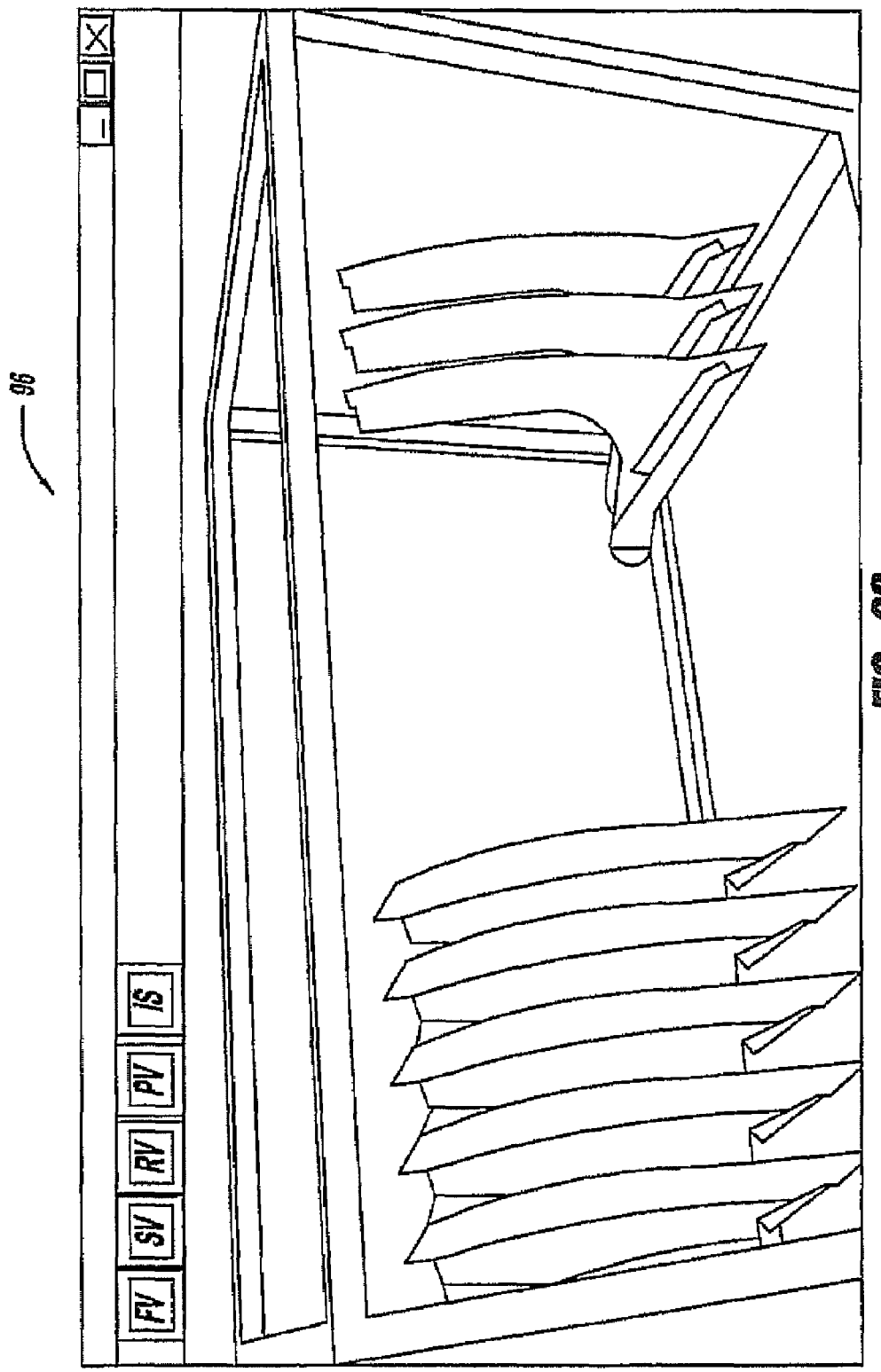
Figure 24:
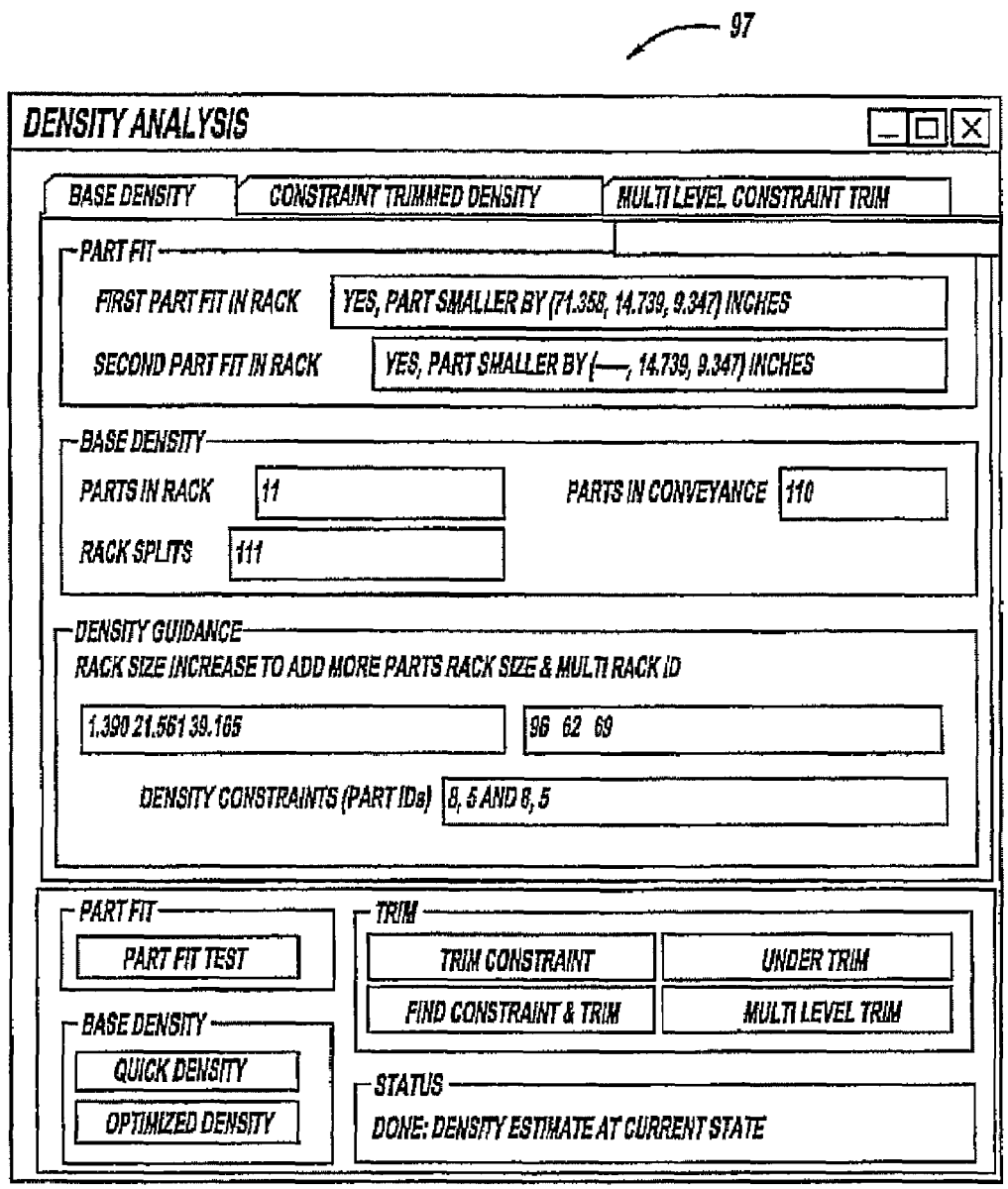

The methodology advances to block 220 and the distance vectors between the corresponding points on the mating boundaries are clustered. FIG. 21 illustrates the distances between points on a first copy 50 and corresponding points on a second copy 50' of the component part model at 94. A minimum distance D* between points associated with the identified features is calculated. D* is defined as equivalent to D. In this example, the distance between features c and e is determined. It should be appreciated that a distance δ, between points associated with features b and f is not presently considered a bottleneck feature. However, the distance δ could become a bottleneck feature, if another one of the primary bottleneck features is altered or removed, such as by changing the design or by assembling a subassembly with the part in a later phase.

In this example, the distance vector is measured as the distance between the corresponding points belonging to the mating boundaries. Assuming that the points belonging to a same pair of corresponding features are approximately same distance apart, these groups of points are identifiable by clustering the distance vector s=∥p1−p2∥ where p1=[x1, y1, z1] and p2=[x2, y2, z2], p1 and p2 are the vectors of corresponding surface points in the 3D space, and ∥.∥ is the Euclidean distance between the points. It should be appreciated that a clustering computer program, such as the SUBCLUST clustering algorithm of Matlab, may be utilized to cluster the distances between the corresponding points of the mating boundaries. This type of clustering algorithm has the advantage of not requiring the user to specify the number of clusters in advance. Additionally it provides the membership grade of each surface point with respect to each of the cluster centers. In this example, the points with the highest membership grades [0.9-1] to the cluster center of points, which characterizes the minimal distance, identifies the primary bottleneck feature. Similarly, the points with the next highest membership grades to the cluster center related to the minimal distance identify the secondary bottleneck feature. The clustered points are shown in the graph in FIG. 22 at 95. The two sets of clusters of points correspond to the primary bottleneck feature and the secondary bottleneck feature. The distances between the cluster centers approximate the distances D* and δ between the primary and a secondary bottleneck features respectively.

In block 225, a potential density improvement (PDI) is determined for each identified bottleneck feature that may be removed or reduced in size. The ratio (δ−D*)/D*, one example of a Potential Density Improvement (PDI), quantifies the potential density improvement if the primary bottleneck feature e is removed or reduced in size. For example, if δ=2D* there is 100% density improvement due to the removal of the primary bottleneck feature. Similarly, if δ=1.5 D*, there is a 50% improvement. Advantageously, the methodology can be utilized to further identify potential bottleneck features, if the first and the secondary features are removed.

The methodology advances to block 230 and the identified bottleneck features are ranked based on their PDI ratios. For example, the bottleneck features may be ranked by severity, which in this example ranges from 100% as the most severe to 0% as the least severe. The methodology returns to block 130 of FIG. 4A with the results of the density improvement analysis by modifying a bottleneck feature and continues. An example of a screen illustrating the density improvement analysis is shown in FIG. 17 at 90, FIG. 18 at 91, FIG. 19 at 92, FIG. 20 at 93, FIG. 23 at 96, and FIG. 24 at 97.

Figure 4D:
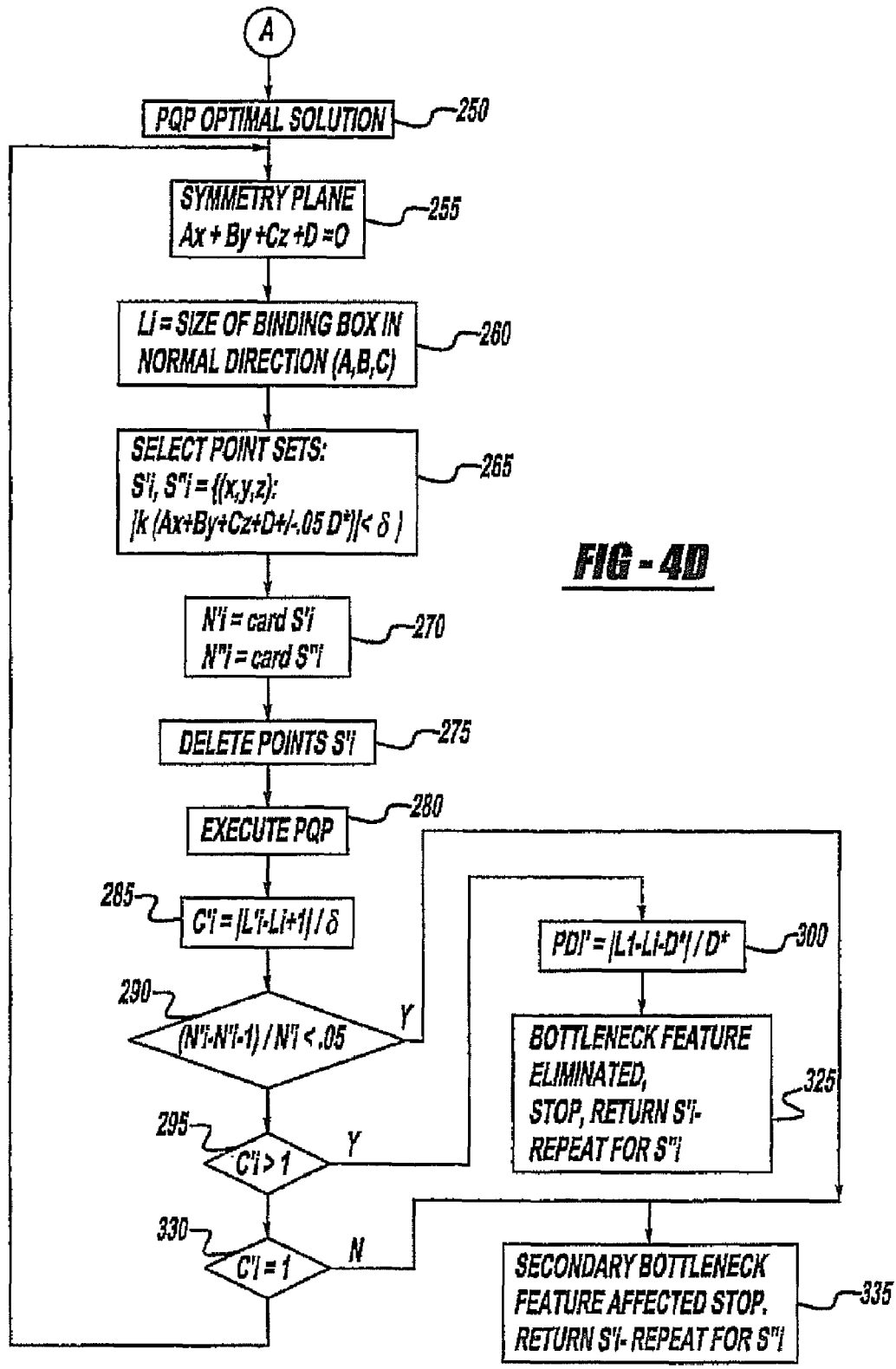

Referring to FIG. 4D, another example of a methodology for determining the potential density improvement ratio (PDI) for an identified bottleneck feature is provided that utilizes sequential feature elimination in order to determine the potential density improvement (PDI) ratio. This methodology may be utilized when the proximity query algorithm computes only the minimal distance between the mating boundaries. Also, this methodology may be utilized in analyzing subassemblies, since the effect of eliminating the bottleneck feature is directly calculated.

The methodology begins in circle B and advances to block 250. In block 250, the optimized component part density from the FIG. 4A is provided as an input. In this example, the optimized component part density represents the minimal distance D* and provides the coordinates of two points belonging to features c and e of the component part 50 as an input.

Figure 25:
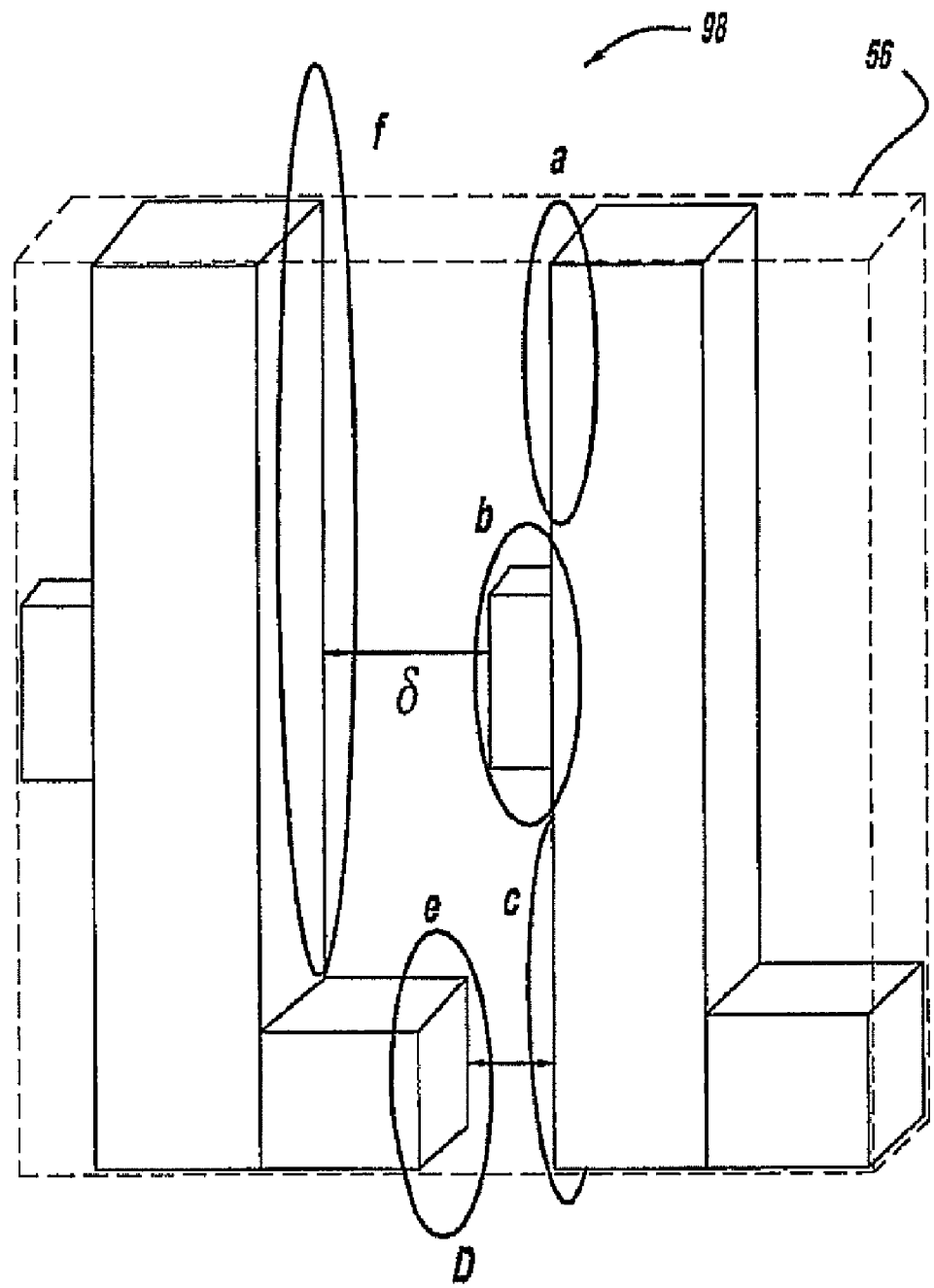
Figure 26:
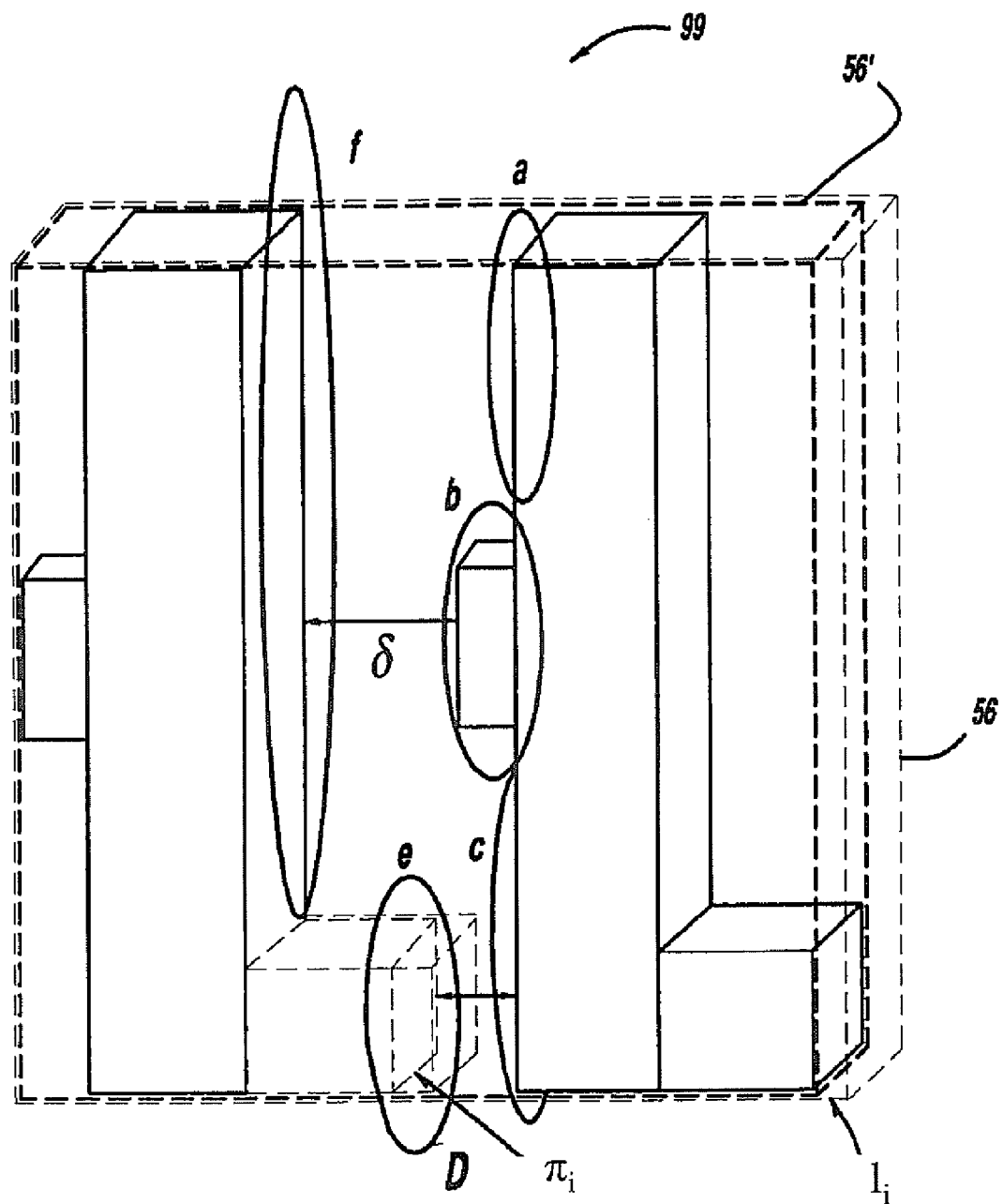

The methodology determines if feature e is a primary bottleneck feature. The component part is fit within a bounding box, as shown at 56 (see FIG. 26). For example, if feature e is a primary bottleneck feature, it may be reduced in size by a predetermined percentage, such as by $\pi i\%$. This will result in a shrinkage of the bounding box shown of li% at 56', while maintaining the minimal distance at D*, as illustrated in FIGS. 25 and 26 at 98 and 99 respectively. It should be appreciated that the distance between the secondary bottleneck features will also shrink from $\pi$ to $\pi'$. If feature e is further cut by another 12%, then a similar shrinkage of the bounding box 56' will occur. The relationship:

$$\pi i = li$$

between the change in the size of feature e and the change in size of the bounding box in direction normal to the plane dividing the two parts is true as long as feature e is a primary bottleneck feature.

The maximal PDI that can be achieved by eliminating the primary feature is defined as the maximum shrinkage (dL) of the primary feature e for which the relationship $\pi i = li$ is maintained. This relationship is expressed by the ratio:

$$PDI\max = |D^* - dL|/D^*$$

The methodology advantageously utilizes the relationship between the changes in the shrinkage of the primary bottleneck feature and the bounding box as an indirect indicator of the potential impact of a primary bottleneck feature.

The methodology advances to block 255 and identifies the feature. For example, the relationship between the depth of the cut and the shrinkage of the bounding box in a direction normal to the dividing plane (the plane dividing the two parts) may be monitored to identify the feature. The methodology defines the symmetry plane as s, where:

$$Ax + By + Cz + D = 0$$

S is the plane that symmetrically divides the two copies of the part and D* is the minimal distance between them.

The methodology advances to block 260 and defines the size of the bounding box in the normal direction Li to the plane s.

$$s', s'': A\,x + B\,y + C\,z + D +/- 0.5D^* = 0$$

The methodology advances to block 265 and selects point sets for the planes s', s" that define the boundaries of copy 1 and copy 2. In order to check for a bottleneck feature, a cut is made in a direction normal to the plane s, to eliminate a thin slice of points (of size δ) in the vicinity of the boundary plane. These points (x, y z) satisfy the inequalities:

$$|k(Ax+By+Cz+D+/-0.5D^*)| < \delta$$

where k is the coefficient normalizing the plane equation:

$$k = 1/(A^2+B^2+C^2)^{0.5}$$

The methodology advances to block 270 and N is defined as the number of points satisfying the inequality constraint:

$$N'i = \text{card}\, S'i$$

$$N''i = \text{card}\, S''i$$

The methodology advances to block 275 and the N points satisfying the inequality constraint are eliminated. For example the points S'i are eliminated.

The methodology advances to block 280, and the optimization algorithm is rerun using the remaining points. The methodology advances to circle A of FIG. 4B, and upon completion advances to block 285 and continues.

In blocks 285 through 335, the methodology determines the status of the bottleneck feature and any secondary feature. The methodology determines if the bottleneck feature has been eliminated by checking the new size of the bounding box 56'. For example, in block 285, the coefficient C is defined by the equation:

$$C = (L1-L2)/\delta$$

and characterizes the impact of the feature that is affected by the cut.

The methodology advances to diamond 290 and determines if the ratio of the number of points Ni removed by the current cut is less than a predetermined value:

$$(Ni-Ni-1)/Ni < 0.05.$$

If the ratio is small, i.e. less than the predetermined value, the methodology advances to block 335. If the ratio is greater than the predetermined value, the methodology advances to diamond 295.

In block 295 the methodology determines if the bottleneck feature has been completely removed. For example, if the bottleneck feature is completely removed, then the change of the bounding box will be greater then the slice thickness, i.e. the relationship:

$$C' > 1$$

indicates the complete removal of a bottleneck feature. If the bottleneck feature has been removed, the methodology advances to block 300. If the bottleneck feature has not been removed, the methodology advances to block 330, to be described.

In block 300 the maximal PDI is determined if the bottleneck feature has been removed by the maximal shrinkage of the bounding box, as shown by the equation:

$$PDI\max = |L1 - Li - D^*|/D^*$$

Returning to block 295, if the bottleneck feature has not been removed, the methodology advances to diamond 330 and determines if the bottleneck feature is affected. For example, if the bottleneck feature is affected, the size of the bounding box will shrink by δ and C=1.

If the bottleneck feature is affected, the methodology returns to block 255 and continues to remove the bottleneck feature. If the bottleneck feature is not affected, the methodology advances to block 335. In block 335 it is determined if a secondary is now a bottleneck feature. For example, if the change of the bounding box is less than the change due to slicing, i.e. the relationship:

$$\delta > Li - Li+1$$

i.e., $$C < 1$$

and/or the number of points will significantly change. The methodology also determines whether the current cut affects another feature. For example, the number of points Ni removed by the current cut is defined as:

$$Ni = \text{card}\{(x,y,z) : |k(Ax+By+Cz+D+/-0.5D^*)| < \delta\}$$

If another feature is affected by the cut then the number of points will significantly increase, and:

$$Ni+1 \gg Ni$$

When it is determined that the bottleneck feature is eliminated, the methodology returns the point set S'i and repeats the optimization algorithm for point set S"I, as indicated in block 325.

In another example, the overall distance between the points removed by the cut is utilized to determine if another cut affects another feature. If another feature is not affected by the current cut, the overall distance between the points should remain the same, i.e. Ni*(Ni−1)/2, or the distances between all Ni points affected by the ith cut, is calculated. The methodology returns to circle A of FIG. 4B and continues.

Referring to FIG. 4E, another embodiment of a methodology for determining the potential density improvement, or PDI, is illustrated. In this embodiment, PDI is calculated directly. This embodiment is advantageously applicable to subassemblies. The methodology is called for from circle B of FIG. 4A and continues to block 350, with the user identifying subassembly parts. The user may be presented with a list of subassembly parts on the display screen.

The methodology advances to block 355 and the user selectively removes a subassembly. For example, the user may utilize the user input device to identify the subassembly to be removed.

The methodology advances to block 360 and the potential density improvement is calculated for the component part with the subassembly removed using the PQP methodology described with respect to FIG. 4B.

The methodology advances to block 365 and determines which subassembly removal resulted in the maximum density for the component part. Preferably, this is the subassembly that should be removed. It should be appreciated that this example may be combined with a visual display of the bottleneck features to improve its efficiency. The methodology returns to circle B of FIG. 4A and continues.

It should be appreciated that the above-described methodology is executable in an iterative manner. The user 26 may advantageously elect to selectively change a design parameter as part of a comprehensive packaging study for a component part. The shipping density optimization software program optimizes factors such as a feature on the component part, the number of component parts in the rack, the configuration of component parts stored on the rack, the size of the rack, the number of racks per container, and the type of conveyance. This virtual design process is a timesaver over current manual shipping density analysis practices. It also ensures the quality and consistency of the determining shipping density for various component parts for a particular model of vehicle, and across model lines.

Advantageously, this is a time and cost savings as compared to previous manual methods of evaluating shipping density. In addition, the computer-implemented method of interactively optimizing shipping density for a container combines all of the foregoing to provide an efficient, flexible, rapid tool for evaluating the various design proposals. Furthermore, the design proposal is available for further analysis and study.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed:

1. A system for interactively optimizing shipping density of multiple copies of a component part in a container by a user comprising:

a user computer system, wherein the user computer system includes a memory, a processor, a user input device and a display device;

a communications network;

a remotely located computer system operatively in communication with the user computer system via the communications network, wherein the remotely located computer system includes a processor, a memory, and a data storage means;

a data storage device operatively in communication with the user computer system and the remotely located computer system via the communications network;

a computer-generated model of the component part stored in the data storage means;

a computer-generated model of the container stored in the data storage means; and an executable shipping density optimization software program, wherein the user uses the user computer system to execute the shipping density optimization software program and to communicate with the remotely located computer system to interactively select the component part model and the container model, and the software program is configured to:

calculate an initial shipping density for the multiple copies of the component part within the container by arranging at least a first copy and a second copy of the component part model within the container model, determine a plurality of minimal distance vectors between a plurality of pairs of points, each of the plurality of pairs of points consisting of a first point on the first copy of the component part model and a second point on a mating boundary of the second copy of the component part model, cluster the plurality of minimal distance vectors to create a plurality of clusters identifying a plurality of groups of points that belong to respective pairs of corresponding features having mating boundaries, identify a bottleneck feature of the component part model limiting the initial shipping density because the bottleneck feature establishes a minimum allowable clearance between the first and second copies of the component part model, wherein a first group of the plurality of groups of points with a highest membership grade to its respective cluster center characterizes a minimal distance between the first and second copies of the component model to thereby identify the bottleneck feature, prompt the user to modify at least one dimension of the bottleneck feature to create a modified component part model, the modification being representative of changing a manufacturing process used to produce the component part such that a portion of the process is performed after the component part is shipped to a destination, calculate an improved shipping density for the multiple copies of the modified component part model within the container model, and determine a potential shipping density improvement resulting from the modification of the at least one dimension of the bottleneck feature.

2. The system as set forth in claim 1 wherein the data storage means includes a component parts library containing a mesh model of the component part.

3. The system as set forth in claim 1 wherein the data storage means includes a library containing the container model.

4. The system as set forth in claim 1 wherein the shipping density optimization software program analyzes a cost of transporting the container using the shipping density for the component part in the container.

5. The system as set forth in claim 1 wherein the shipping density optimization software program determines a potential density improvement ratio if the bottleneck feature is reduced in size or eliminated from the component part model.

6. The system as set forth in claim 1 wherein the container is a rack.

7. A method of allowing a user to interactively optimize shipping density of a plurality of copies of a component part in a container using a computer system, the method comprising the steps of:

selecting a model of the component part from a component part model database in communication with the computer system via a communications network, the component part model representing the component part at a first stage in its manufacturing process;

selecting a model of the container from a container database in communication with the computer system via the communications network;

creating an initial configuration of at least a first copy and a second copy of the component part model within the container model, the initial configuration being based at least in part upon an assumed volume-efficient layout;

using a shipping density optimization software program to reconfigure the copies of the component part model within the container model to achieve a second configuration having an optimized density of the first and second copies of the component part model within the container model, the second configuration based at least in part upon a minimum allowable clearance between the first and second copies of the component part models;

determining a plurality of minimal distance vectors between a plurality of pairs of points, each of the plurality of pairs of points consisting of a first point on the first copy of the component part model and a second point on a mating boundary of the second copy of the component part model when the first and second copies of the component part model are in the second configuration;

clustering the plurality of minimal distance vectors to create a plurality of clusters identifying a plurality of groups of points that belong to respective pairs of corresponding features having mating boundaries;

identifying a bottleneck feature of the component part model that limits the optimized density because a point on the bottleneck feature establishes the minimum allowable clearance when the copies of the component part model are in the second configuration, wherein a first group of the plurality of groups of points with a highest membership grade to its respective cluster center characterizes a minimal distance between the first and second copies of the component model to thereby identify the bottleneck feature;

modifying a dimension of the bottleneck feature to create a modified component part model representing the component part at a second stage in its manufacturing process, wherein a portion of the manufacturing process comprising a difference between the first stage and the second stage may be performed after the component part is shipped to a destination, the modification resulting in a shrinking of a bounding box enclosing a first copy and a second copy of the modified component part model;

using the shipping density optimization software program to reconfigure at least the first copy and the second copy of the modified component part model within the container model to achieve a third configuration having an improved optimized density of the modified component part models in the container model; and providing the optimized density of the component part model and the improved optimized density of the modified component part model to the user.

8. The method as set forth in claim 7 wherein the step of selecting a component part model further includes the step of selecting a geometric model of the component part from a library of geometric component part models maintained in a data storage device.

9. The method as set forth in claim 7 wherein the step of selecting a container model further includes the step of identifying parameters for selecting the container model and using the identified parameters to select the container model.

10. The method as set forth in claim 7 further including the step of selecting a transportation conveyance for transporting the container from a list of transportation conveyances stored in at least one of the component part model database and the container database.

11. The method of claim 7 wherein the step of modifying a dimension of the bottleneck feature comprises:
identifying a subassembly of the component part that may be shipped separately to the destination; and
creating the modified component model by removing a portion of the component part model representing the subassembly from the component part model.

12. The method of claim 7 wherein the step of modifying a dimension of the bottleneck feature comprises:
identifying a metal-forming step performed on the component part during its manufacture that may be performed at the destination; and
creating the modified component model altering the component part model to reflect the component part before the metal-forming step is performed.

13. The method of claim 7 further comprising:
calculating a first cost related to manufacturing the component part and shipping it to the destination in the second configuration;
calculating a second cost related to manufacturing the component part modified in a manner represented by the modified component part, shipping the modified component part to the destination in the third configuration, and performing additional manufacturing steps to complete the component part; and
providing a comparison of the first and second costs to the user.

14. A method of interactively optimizing shipping density of a plurality of copies of a component part in a container using a computer system, the method comprising the steps of:
selecting a model of the component part using the computer system, wherein the component part model is a geometric model of the component part selected from a library of geometric component part models maintained in a data storage device in communication with the computer system via a communications network;
selecting a model of the container from a container database in communication with the computer system via the communications network;
determining an optimized density for the component part model in the container model by arranging first and second copies of the component part model within the container model in a first configuration;
determining a plurality of minimal distance vectors between a plurality of pairs of points, each of the plurality of pairs of points consisting of a first point on the first copy of the component part model and a second point on a mating boundary of the second copy of the component part model when the first and second copies of the component part model are in the second configuration;
clustering the plurality of minimal distance vectors to create a plurality of clusters identifying a plurality of groups of points that belong to respective pairs of corresponding features having mating boundaries;
identifying a bottleneck feature of the component part model that reduces the optimized density because the bottleneck feature of the first copy of the component part model is less than a minimum allowable clearance from a surface of the second copy of the component part model, wherein a first group of the plurality of groups of points with a highest membership grade to its respective cluster center characterizes a minimal distance between the first and second copies of the component model to thereby identify the bottleneck feature;
modifying at least one dimension of the bottleneck feature to create a modified component part model, the modification permitting shrinking of a bounding box enclosing first and second copies of the modified component part model, and the modification being representative of changing a manufacturing process used to produce the component part wherein a portion of the process may be performed after the component part is shipped to a destination;
determining an optimized density for the modified component part model in the container model by arranging the first and second copies of the modified component part model within the container model in a second configuration;
providing the optimized density of the component part model in the container model and optimized density of the modified component part model in the container model to a user;
calculating a first cost related to manufacturing the component part and shipping it to the destination in the second configuration;
calculating a second cost related to manufacturing the component part modified in a manner represented by the modified component part, shipping the modified component part to the destination in the third configuration, and performing additional manufacturing steps to complete the component part; and providing a comparison of the first and second costs to a user.

15. The method of claim 14 further comprising comparing the optimized density of the component part model with the optimized density of the modified component part model to determine a potential density improvement using the modified component part model.

16. The method of claim 14 wherein the step of modifying at least one dimension of the component part model includes the steps of:

identifying a subassembly of the component part that may be shipped separately to the destination; and creating the modified component model by removing a portion of the component part model representing the subassembly from the component part model.

* * * * *